United States Patent [19]

Nobuyuki et al.

[11] Patent Number: 5,491,388

[45] Date of Patent: Feb. 13, 1996

[54] POWER REGULATOR OF DISCHARGE LAMP AND VARIABLE COLOR ILLUMINATION APPARATUS USING THE REGULATOR

[75] Inventors: Yamada Nobuyuki; Douke Takahiro; Tsuji Hidetoshi, all of Kitakyushu, Japan

[73] Assignee: Toto Ltd., Japan

[21] Appl. No.: 307,677

[22] PCT Filed: Mar. 24, 1993

[86] PCT No.: PCT/JP93/00353

§ 371 Date: Sep. 22, 1994

§ 102(e) Date: Sep. 22, 1994

[87] PCT Pub. No.: WO93/19570

PCT Pub. Date: Sep. 30, 1993

[30] Foreign Application Priority Data

Mar. 25, 1992 [JP] Japan .......................... 4-98949
Apr. 23, 1992 [JP] Japan .......................... 4-131854
Feb. 24, 1993 [JP] Japan .......................... 5-61005

[51] Int. Cl.⁶ ............................................. G05F 1/00
[52] U.S. Cl. ..................... 315/308; 315/307; 315/208; 315/224; 315/DIG. 4; 315/DIG. 7
[58] Field of Search ............................ 315/308, 307, 315/208, 224, 226, 241 R, DIG. 4, DIG. 7

[56] References Cited

U.S. PATENT DOCUMENTS

| | | | |
|---|---|---|---|
| 4,277,728 | 7/1981 | Stevens | 315/307 |
| 4,356,433 | 10/1982 | Linden | 315/308 |
| 4,471,269 | 9/1984 | Ganser et al. | 315/307 |
| 4,791,338 | 12/1988 | Dean et al. | 315/DIG. 7 X |
| 4,949,016 | 8/1990 | De Bijl et al. | 315/208 |
| 5,334,915 | 8/1994 | Ohsaki et al. | 315/307 |

FOREIGN PATENT DOCUMENTS

| | | | |
|---|---|---|---|
| 62-241294 | 10/1987 | Japan . | |
| 63-86296 | 4/1988 | Japan . | |
| 1-213996 | 8/1989 | Japan . | |
| 2-61997 | 3/1990 | Japan . | |
| 2-197093 | 8/1990 | Japan . | |
| 4-48586 | 2/1992 | Japan . | |
| 6163180 | 6/1994 | Japan | 315/308 |
| 6176878 | 6/1994 | Japan | 315/308 |

OTHER PUBLICATIONS

PCT–Notification of Transmittal of Copies of Translation of the International Preliminary Examination Report, Dated Aug. 31, 1994, PCT/JP93/00353.

Robert Hall, et al., *122nd Annual SMPTE Technical Conference, Nov. 9–14, 1980, New York*, "High–Power Single–Ended Discharge Lamps for Film Lighting"; Printed Aug. 1981, pp. 678–685.

*Primary Examiner*—Robert J. Pascal
*Assistant Examiner*—Haissa Philogene
*Attorney, Agent, or Firm*—Ostrolenk, Faber, Gerb & Soffen

[57] ABSTRACT

A current supplied to a discharge lamp (100) is an A.C. current having a predetermined frequency from an inverter circuit (70), and its power control is carried out by changing the current setting (setting signal) of a chopper circuit (40) constituting a constant current circuit. When a value is set by an output luminance regulator (120), this set current value is inputted to a chopper control circuit (130). The chopper control circuit (130) checks the current detected by a current detector (110) and outputs a current control to a gate terminal (41) of the chopper circuit (40) so that the output current may coincide with the set current value. Accordingly, the power supplied from the inverter circuit (70) to the discharge lamp (100) is controlled by the chopper circuit (40).

17 Claims, 18 Drawing Sheets

Fig. 2(A)
AC VOLTAGE
Fig. 2(B)
OUTPUT VOLTAGE
OF RECTIFIER
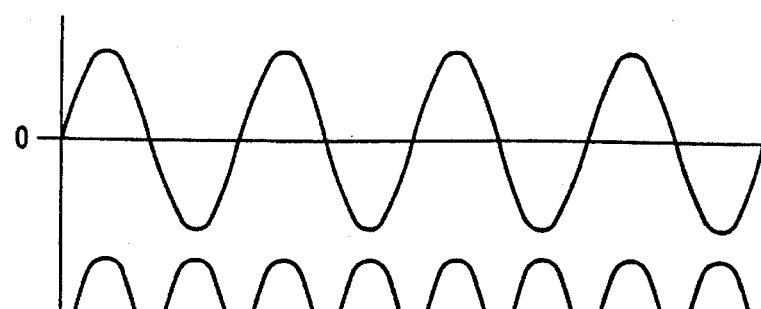
Fig. 2(C)
OUTPUT VOLTAGE
OF SMOOTHING CAPACITOR
Fig. 2(D)
OUTPUT VOLTAGE
OF CHOPPER CIRCUIT
Fig. 2(E)
OUTPUT CURRENT
OF DC REACTOR
Fig. 2(F)
OUTPUT CURRENT
OF INVERTER CIRCUIT
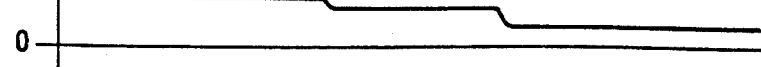
Fig. 2(G)
OUTPUT CURRENT
OF OUTPUT LUMINANCE
REGULATOR
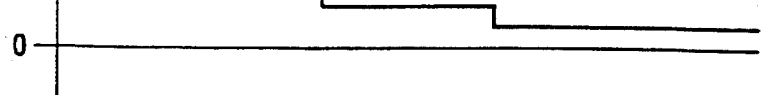
T1 → T2
TIME

Fig. 21

| No | DISCHARGE LAMP R POWER (W) | DISCHARGE LAMP G POWER (W) | DISCHARGE LAMP B POWER (W) | ILLUMI-NANCE (cd/m²) | CHROMATICITY (CIE) | | COLOR TEMP. (K) |
|---|---|---|---|---|---|---|---|
| | | | | | x | y | |
| 1 | 250 | 250 | 250 | $9.425 \times 10^5$ | 0.3366 | 0.3462 | 5,323 |
| 2 | 250 | 250 | 150 | $8.014 \times 10^5$ | 0.3799 | 0.4311 | 4,331 |
| 3 | 250 | 150 | 150 | $7.848 \times 10^5$ | 0.4326 | 0.3990 | 3,032 |
| 4 | 250 | 150 | 250 | $7.702 \times 10^5$ | 0.3614 | 0.2981 | 3,893 |
| 5 | 150 | 250 | 250 | $7.626 \times 10^5$ | 0.2979 | 0.3937 | 6,721 |
| 6 | 150 | 150 | 250 | $7.476 \times 10^5$ | 0.2703 | 0.2312 | 12,435 |
| 7 | 150 | 250 | 150 | $7.259 \times 10^5$ | 0.3097 | 0.4395 | 6,143 |

POWER REGULATOR OF DISCHARGE LAMP AND VARIABLE COLOR ILLUMINATION APPARATUS USING THE REGULATOR

SPECIFICATION

1. Industrial Field

The present invention relates to a power regulator for regulating a discharge lamp and executing a dimmer control, and also to a variable color illuminating apparatus using the regulator.

2. Prior Art

Alternating current is required to energize a discharge lamp, and a conventional discharge lamp regulator with a dimmer circuit for regulating a discharge lamp and executing a dimmer control is disclosed, for example, Japanese Patent Laid-Open Gazette No. H-2-197093.

The discharge lamp regulator converts an alternating current obtained from a commercial ac power source to a direct current with a rectifier and transmits the direct current to a full-bridge inverter circuit while inputting an ac control signal to a gate terminal of the inverter circuit. The inverter circuit then converts the direct current to a square-wave alternating current, which is supplied to energize the discharge lamp.

The discharge lamp regulator further includes a dimmer control circuit for outputting the ac control signal to the gate terminal of the inverter circuit. The control circuit superposes off-times on the on/off operation of the inverter circuit according to luminance reduction of the lamp, thereby substantially executing the dimmer control through the frequency regulation.

Since the dimmer controller executes the frequency regulation, luminance reduction often causes a long off-time in which no power is supplied to the discharge lamp, and further causes undesirable turn-out of the discharge lamp.

In other words, the conventional dimmer controller can not stably reduce the luminance of the discharge lamp and has a very narrow dimmer-operation range.

Moreover, since the dimmer control circuit has a circuit structure to generate the ac control signal for executing the on/off operation and superposing the quiescent time during the on-off operation, the control circuit has a rather complicated and cost-consuming structure.

There is a known technique of controlling the luminance of fluorescent lamps or other similar discharge lamps at a relatively high frequency with an inverter circuit. This technique is, however, not applicable to the control of high illuminance discharge lamps such as metal halide lamps at a constant high frequency because it causes the resonance of the lamps which may result in unintentional turn-out of the lamps.

The metal halide lamps can be regulated stably only at frequencies of a restricted range, and the dimmer control through the frequency regulation is accordingly difficult for the metal halide lamps.

Incidentally, the dimmer control is also desired in variable color illumination apparatus which can vary the chromaticity.

Typical examples of known devices for continuously varying the chromaticity of light emitted from discharge lamps are those disclosed in Japanese Patent Publication Gazette No. S-53-42386 and Japanese Patent Laid-Open Gazette No. S-63-98295. These devices use gases or vapors which are sealed as a luminous body in a discharge lamp and varied the luminous color depending upon the electronic energy in the discharge lamp, and change the color by varying the waveform of a power pulse supplied to the discharge lamp. For example, a relatively large ratio of the power supply time to the quiescent time gives blue light while a relatively small ratio gives red light.

In such devices, however, red light is obtained by extending the quiescent time of a power pulse, and the power supply to the discharge lamp is accordingly reduced. Therefore, in some case, it is difficult to obtain a stable luminance.

A first object of the present invention is thus to provide a power regulator which prevents a discharge lamp from undesirably turning out even during a dimmer control in which the power supply to the discharge lamp is fairly reduced, and which offers a wide range of stable dimmer control.

A second object of the invention is to provide a variable color illumination apparatus which has a sufficient and stable luminance, and which can vary the chromaticity of the light in a relatively wide range.

DISCLOSURE OF THE INVENTION

The above and other objects are attained by a power regulator having a first structure in accordance with the invention. The power regulator further comprises: power setting means for outputting a setting signal to specify a desired value corresponding to a current of the discharge lamp; and dimmer control means for controlling the power supplied to the discharge lamp based on the desired value set by the power setting means. The dimmer control means comprises current regulation means having a current control terminal, interposed between the converter and the inverter, for regulating an output current according to a current control signal supplied to the current control terminal, current detection means for detecting the output current of the current regulation means to thereby generate a detection signal, and current control means for outputting the current control signal to the current control terminal of the current regulation means so that the detection signal output from the current detection means coincides with the setting signal supplied from the power setting means, therein the inverter control circuit converts the direct-current power to the second alternating-current power of a predetermined frequency.

The ac power supplied to the discharge lamp is regulated by varying the desired value of current (setting signal) set by the power setting means. When the power setting means sets the desired value of current, the setting signal corresponding to the desired value is input into the current control means. The current control means outputs a current control signal to the current control terminal of the current regulation means to make a detection signal output from the current detection means, that is, an output current of the current regulation means, coincident with the setting signal supplied from the power setting means. Control of the power supplied to the discharge lamp is implemented not through frequency regulation with the inverter but through the current regulation with the current regulation means. The current supplied to the discharge lamp accordingly has a constant frequency with the varied maximum level. Accordingly, the power regulator of the invention controls the power supply to the discharge lamp through the current regulation with the current regulation means without causing superposition of the quiescent time, which may result in unintentional turn-out of the discharge lamp. The discharge lamp does not turn out due to dimmer operations but it is stably energized in a wide dimmer-operation range.

In another power regulator having a second structure in accordance with the invention, the dimmer control means comprises current detection means for detecting an output current of the converter, and converter control means for executing phase regulation of a semi-conductor switch element included in the converter so that the detection signal output from the current detection means coincides with the setting signal supplied from the power setting means, wherein the inverter control circuit converts the direct-current power to the second alternating-current power of a predetermined frequency. Combination of the converter having the semiconductor switch element and the converter control means attains the similar functions to those of the current regulation means in the first structure of the invention.

It is preferable that an output voltage and an output current of the power regulator have a linear relationship, and that a gradient of the linear relationship is varied according to the desired value set by the power setting means. This allows linear luminance control according to the short-circuit current value of the linear relationship.

More preferably, a no-load voltage in the linear relationship between the output voltage and the output current of the power regulator is constant irrespective of the desired value set by the power setting means, and a short-circuit current on the linear relationship is varied linearly according to the desired value set by the power setting means. This allows linear luminance control according to the power set by the power setting means.

The power regulator may regulate the output of a discharge lamp in a range of about 100 percents through about 130 percents of a rated voltage of the discharge lamp. This allows dimmer control without undesirably shortening the life time of the discharge lamp.

The current of the discharge lamp preferably has a square wave form.

The invention is also directed to a variable color illumination apparatus having a variable color lamp including a plurality of discharge lamps which emit lights of different chromaticity, for regulating a power supplied to each of the plurality of discharge lamps to vary a chromaticity of light emitted from the variable color lamp. The variable color illumination apparatus comprises: power setting means for outputting a setting signal to specify a desired value corresponding to a current of each of the plurality of discharge lamps; and a plurality of dimmer control means for regulating the power supplied to each of the plurality of discharge lamps based on the desired value specified by the power setting means. The variable color illumination apparatus uses a plurality of dimmer control means to allow each discharge lamp to be stably energized in a wide dimmer-operation range, thereby stably emitting light of a desirable color at a sufficient luminance.

BRIEF DESCRIPTION OF THE DRAWINGS

FIGS. 2(A) through 2(G) are charts showing operating conditions of the power regulator in the embodiment;

FIG. 21 is a table showing the relationship between the combinations of power supplied to the three different color discharge lamps and the luminous colors of the illumination apparatus.

BEST MODE FOR EMBODYING THE INVENTION

The structures and functions of the present invention will become more apparent through the following description of preferred embodiments in accordance with the invention.

Figure 1:
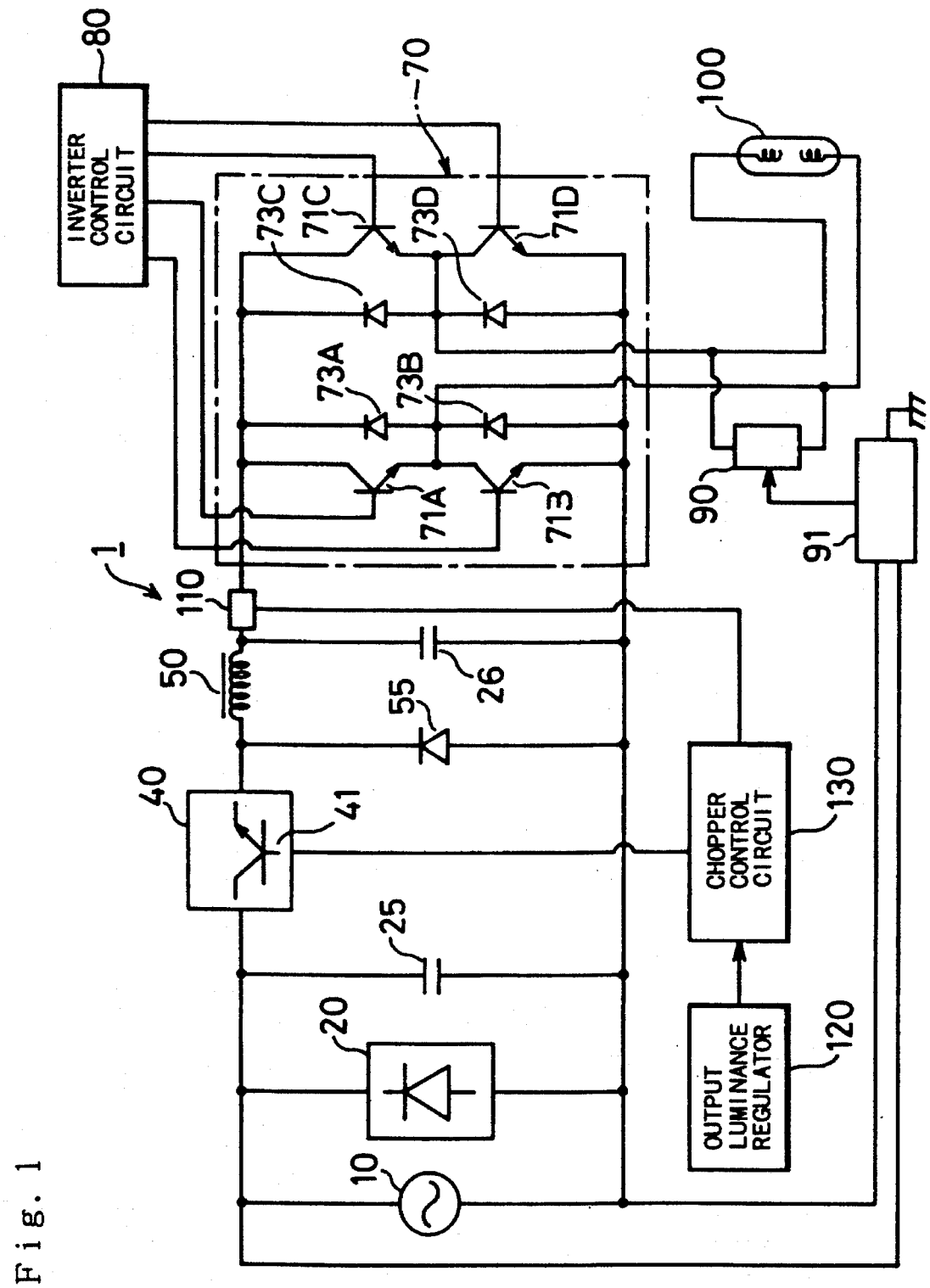
FIG. 1 is a circuit diagram illustrating a power regulator for regulating power supplied to a discharge lamp, embodying the invention.

FIG. 1 is a circuit diagram illustrating a power regulator for controlling the power supplied to a discharge lamp as one embodiment of the invention. The power regulator 1, as illustrated in FIG. 1, comprises a chopper circuit, an inverter circuit, and a variety of control circuits for regulating these circuits.

With referring to FIG. 1, a commercial alternating current (ac) power source 10 generates a commercial frequency of 50 Hz or 60 Hz at 100 V ac. The commercial ac power source 10 is connected to a rectifier 20, which is a known circuit having diodes arranged in a bridge structure and includes a transformer (not shown).

Output terminals of the rectifier 20 are connected to a smoothing capacitor 25 for converting a square-wave direct current to a smooth direct current. An output terminal of the rectifier 20 is connected to a chopper circuit 40, which is provided with a switching unit such as a thyristor and a transistor. The chopper circuit 40 receives at a gate terminal 41 thereof a control signal supplied from a chopper control circuit 130 (described later) to change its ON/OFF state. The chopper circuit 40 functions as a switch unit of a constant-current circuit which converts the electric current to a pulse voltage wave of 100 kHz so as to keep the electric current constant.

A dc reactor 50 is connected to an output terminal of the chopper circuit 40 in series. A freewheeling diode 55 is connected in parallel at the input side of the dc reactor 50, and a smoothing capacitor 26 is also connected in parallel at the output side of the dc reactor 50. The dc reactor 50 and the smoothing capacitor 26 smooth the direct current with ripples supplied from the chopper circuit 40.

An inverter circuit 70 is connected to the output side of the dc reactor 50 via a current detector 110 (described later). The inverter circuit 70 functions as a direct current-to-alternating current converter, which converts the direct current supplied from the chopper circuit 40 to an alternating current of various frequencies ranging from 50 through 120 Hz. The inverter circuit 70 includes four switching transistors 71A, 71B, 71C, and 71D arranged in a full-bridge structure, and circulating diodes 73A, 73B, 73C, and 73D arranged at the switching transistors 71A, 71B, 71C, and 71D, respectively.

The inverter circuit 70 is connected to an inverter control circuit 80, which alternately switches on and off the first pair of the switching transistors 71A and 71D and the second pair of the switching transistors 71B and 71C at a predetermined cycle. The inverter control circuit 80 generates square waves of the predetermined cycle with an oscillator (not shown), and transmits the square waves to the switching transistors 71A through 71D so as to allow the inverter circuit 70 to output an alternating current of a square-wave form.

A high pressure discharge lamp 100 is coupled with output terminals of the inverter circuit 70. The high pressure discharge lamp 100 is, for example, a 250-W metal halide lamp, which is energized preferably at frequencies ranging from 50 through 120 Hz.

The high pressure discharge lamp 100 is connected to an igniter 90, which applies a high voltage (a pulse voltage of not less than 27 kV) to the high pressure discharge lamp 100 through switching operations of a switch circuit 91 so as to turn on the discharge lamp 100, and stops the application of the pulse voltage after the high pressure discharge lamp 100 is switched on.

A power control circuit of the high pressure discharge lamp 100 is constituted by the current detector 110, an output luminance regulator 120, and the chopper control circuit 130.

The output side of the chopper control circuit 130 is connected to the current detector 110, and a detection signal of the detector is input to the chopper control circuit 130. The chopper control circuit 130 also receives a signal from the output luminance regulator 120.

The output luminance regulator 120 works to regulate the luminance of the high pressure discharge lamp 100. In one preferable structure, the output luminance regulator 120 outputs a current setting according to an angle of a control knob (not shown) corresponding to a desired luminance level of the high pressure discharge lamp 100.

The chopper control circuit 130 comprises a frequency divider for dividing a signal of a specific frequency supplied from the oscillator to generate a pulse signal of various frequencies. The chopper control circuit 130 supplies an ON/OFF control signal to the gate terminal 41 of the chopper circuit 40 in response to a feedback of the current detected by the current detector 110, thereby allowing the chopper circuit 40 to output the constant current preset by the output luminance regulator 120.

The chopper circuit 40, the current detector 110, and the chopper control circuit 130 constitute a constant-current circuit for maintaining the certain current preset by the output luminance regulator 120, and the level of the output current can be changed by varying the preset value of the output luminance regulator 120.

Operations of the power regulator 1 for controlling the power supplied to the discharge lamp are described along with the waveforms of FIG. 2.

An alternating current shown in FIG. 2(A), which is supplied from the commercial ac power source 10, is transformed by the transformer included in the rectifier 20 and then rectified to a direct current (FIG. 2(B)). The rectified direct current is smoothed by the smoothing capacitor 25 and inputted to the chopper circuit 40 (FIG. 2(C)).

The chopper circuit 40 receives at its gate terminal 41 the ON/OFF control signal (100 kHz) generated by the chopper control circuit 130, and converts the smoothed direct current inputted into the chopper circuit 40 to a pulse voltage output corresponding to a cycle of the ON/OFF control signal (FIG. 2(D)). The chopper control circuit 130 outputs the ON/OFF control signal to the gate terminal of the chopper circuit 40 based on the feedback of the current detected by the current detector 110, thereby allowing the chopper circuit 40 to output the constant current which is preset by the output luminance regulator 120.

The output current is further smoothed by the dc reactor 50 and the smoothing capacitor 26 (FIG. 2(E)), and transmitted to the inverter circuit 70.

The inverter circuit 70 receives an ac control signal of a certain frequency (50 through 120 Hz) alternately at the first pair of the switching transistors 71A and 71D and at the second pair of the switching transistors 71B and 71C, converts the direct current supplied from the dc reactor 50 to a square-wave alternating current having a predetermined frequency, and supplies the square-wave alternating current to the high pressure discharge lamp 100 (FIG. 2(F)).

The alternating current of the predetermined frequency converted by the inverter 70 and the supplied into the high pressure discharge lamp 100 is adjusted by varying the preset value of the output luminance regulator 120.

A change of the preset value at the output luminance regulator 120 is inputted into the chopper control circuit 130, which outputs the ON/OFF control signal of the predetermined cycle corresponding to the preset value to the gate terminal 41 of the chopper circuit 40 based on the feedback of the current detected by the current detector 110. The chopper circuit 40 receives the ON/OFF control signal and changes the output current accordingly.

In the example of FIG. 2, the preset value is changed to smaller values at first and second time points T1 and T2.

The power control by the power regulator 1 is executed through the current regulation with the chopper circuit 40 and not through the frequency regulation with the inverter circuit 70. The power supply is changed in its level of the alternating current while its cycle is unchanged.

The power supply accordingly changes the luminance of the high pressure discharge lamp 100 in a relatively wide range without causing superposition of the quiescent time, which may result in unintentional turn-out of the high pressure discharge lamp 100.

The circuit structure described above is intended to change the current in the current regulation means while keeping the frequency in the inverter circuit unchanged, and it has a simpler circuit structure than a conventional circuit for changing the frequency in the inverter circuit.

Since the high pressure discharge lamp 100 is regulated at a relatively low, constant frequency, and thereby does not unintentionally turn out due to the resonance effects which are often observed as described in the prior art section of this specification.

Figure 3:
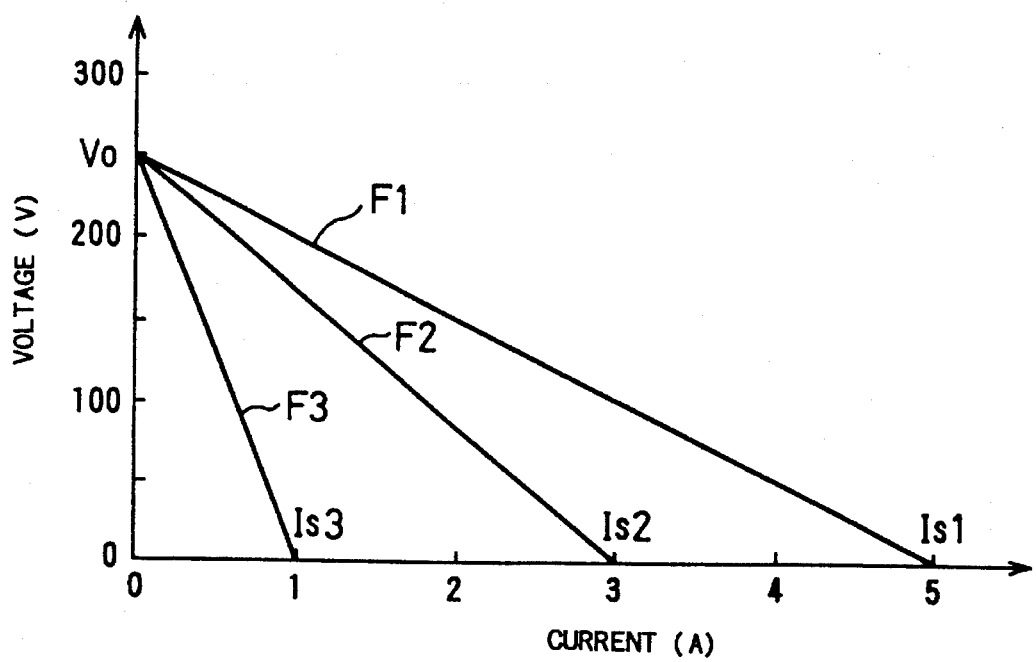
FIG. 3 is a characteristic chart showing voltage-current characteristic curves when a genuine resistance is connected to the power regulator of the embodiment.

FIG. 3 is a graph showing the relationship between the output voltage and the output current when a genuine resistance is connected, in place of the high pressure discharge lamp 100, to the power regulator 1. As clearly illustrated in FIG. 3, genuine load characteristics F1 are expressed as a line having a negative gradient and an intersection of a constant no-load voltage V0 (250 volts in this example). The gradient of the genuine load characteristics varies as shown by the lines F1 through F3 according to a variation in the preset value of the output luminance regulator 120. A short-circuit current of the voltage-current characteristics is linearly shifted from Is1 to Is3 (which are intersections between the abscissa and the voltage-current characteristics F1 through F3, respectively) according to the variation in the preset value of the output luminance regulator 120.

Figure 4:
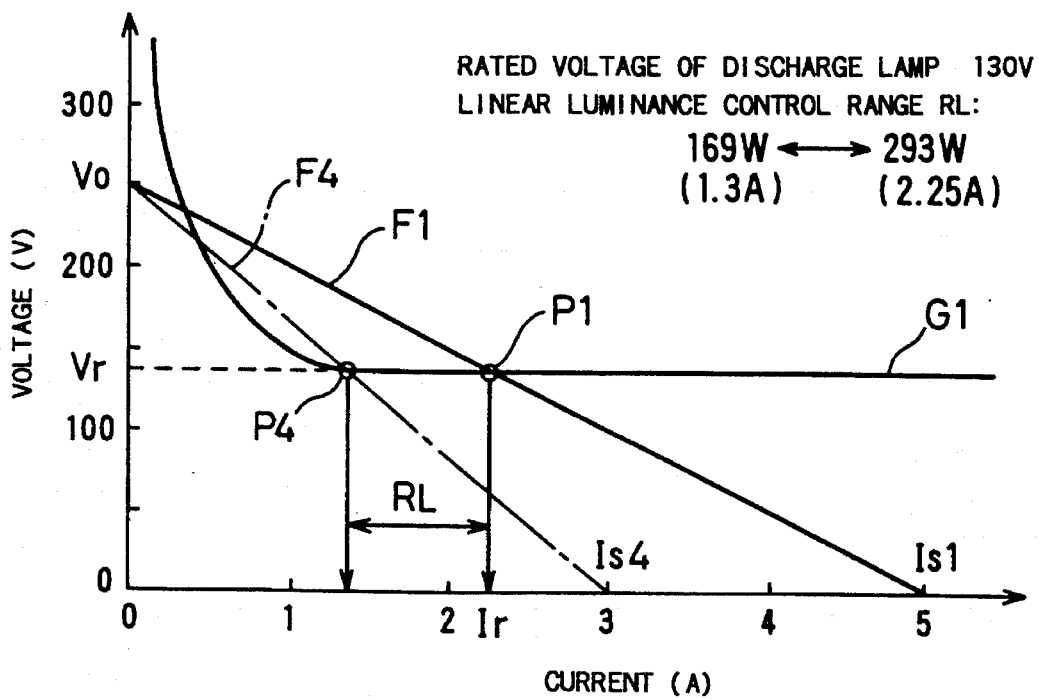
FIG. 4 is a characteristic chart showing voltage-current characteristic curves of the discharge lamp and the power regulator.

FIG. 4 is a graph showing the voltage-current characteristics when the high pressure discharge lamp 100 is connected, and a curve G1 represents load characteristics of the high pressure discharge lamp 100. In a steady state, there is almost no phase deviation in the output voltage-output current curve of the discharge lamp 100, and the discharge lamp 100 can thus be regarded virtually as a genuine resistance. A light-on condition is accordingly defined by an intersection P1 of the voltage-current characteristic curve F1 of the power regulator 1 and the load characteristic curve G1 of the discharge lamp 100. The voltage-current characteristic curve F1 of the power regulator 1 represents a rated voltage-current characteristic giving a rated lamp voltage Vr and a rated lamp current Ir.

On the load characteristic curve G1 of the discharge lamp shown in FIG. 4, the lamp voltage is hardly changed with a variation in the lamp current in the vicinity of the rated lamp voltage Vr and is substantially constant in a range RL between two points P1 and P4. Values of the short-circuit current Is1 and Is4 on the voltage-current characteristic curves F1 and F4 of the power regulator 1 show a linear shift according to the preset value change of the output luminance regulator 120. The lamp current in the range RL between the points P1 and P4 is accordingly proportional to the preset value of the output luminance regulator 120.

The luminance of the discharge lamp 100 is in proportion to the lamp current under the constant lamp voltage. Therefore the power regulation of the discharge lamp 100 in the range RL of FIG. 4 will change the luminance of the discharge lamp 100 linearly with the variation in the preset value of the output luminance regulator 120. Namely, the luminance of the discharge lamp 100 can be controlled linearly in the range RL according to the preset value of the output luminance regulator 120 (for example, according to an angle of the dimmer control knob).

The following three factors contribute to the linear variation in the luminance of the discharge lamp 100 according to the preset value of the output luminance regulator 120 in the linear luminance control range RL: (1) The voltage-current characteristics of the power regulator 1 can be expressed as straight lines all running through the same no-load voltage V0 with different gradients; (2) The short-circuit current Is on the voltage-current characteristic curve of the power regulator 1 is linearly shifted with the variation in the preset value of the output luminance regulator 120; and (3) the lamp can be regarded virtually as a genuine resistance.

Figure 5:
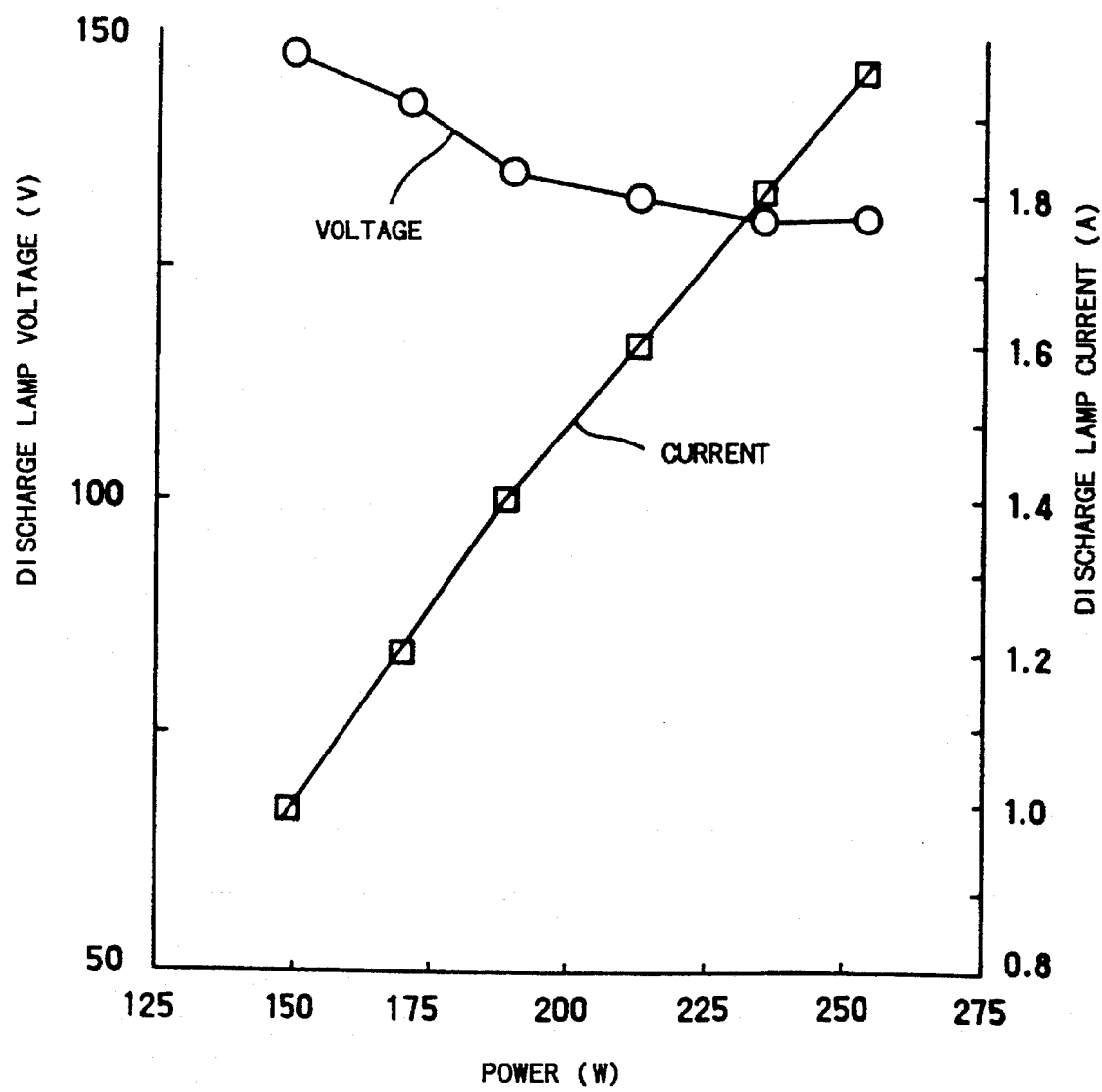
FIG. 5 is a characteristic chart showing the voltage and the current of the discharge lamp plotted against the power.

FIG. 5 is a graph showing the result of an experiment which measures voltage and current characteristics of the lamp along with the variation in the preset value of the output luminance regulator 120. The lamp voltage was kept substantially constant when the lamp current was not less than 1.3 A. Since lighting at the lamp voltage of not less than 130% of the rated lamp voltage undesirably shortens the life time of the lamp, it is thus preferable to set the lamp voltage in a range of 100 through 130 percents of the rated lamp voltage.

Figure 6:
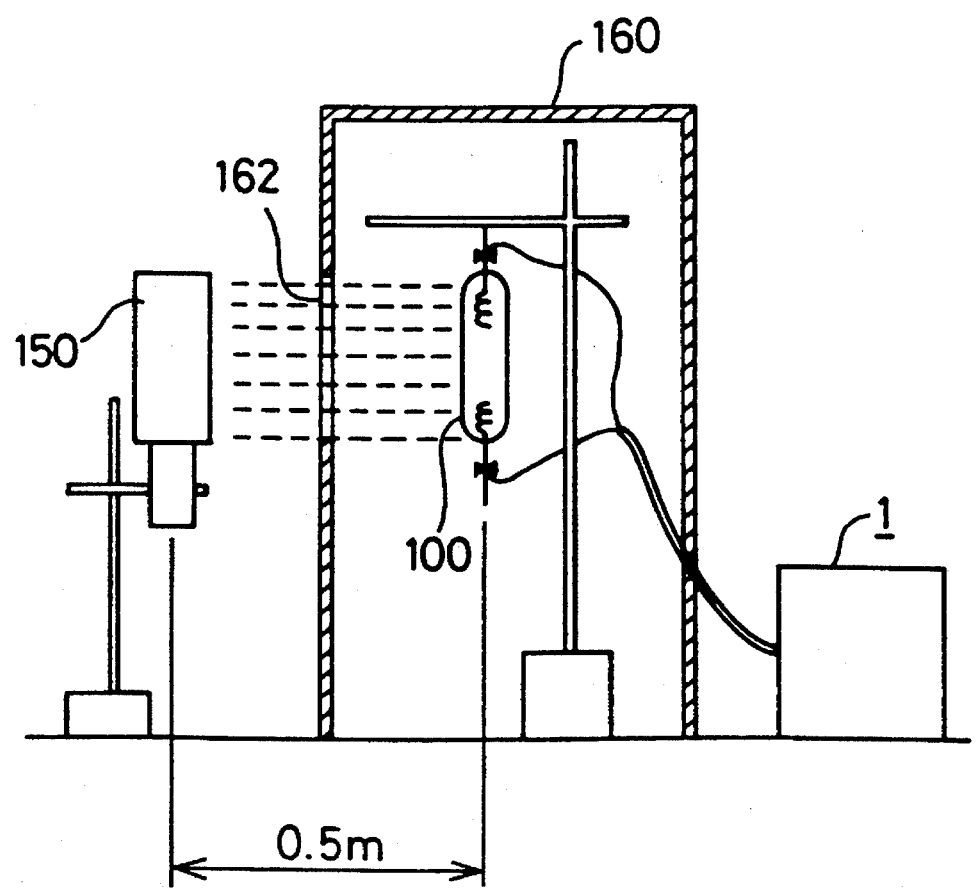
FIG. 6 illustrates an experimental arrangement used for studying the relationship between the power of the power regulator and the illuminance in the embodiment.

FIG. 6 conceptually shows an experimental arrangement which measures the illuminance of the high pressure discharge lamp (250 W metal halide lamp) 100 while controlling the luminance of the discharge lamp 100.

Figure 7:
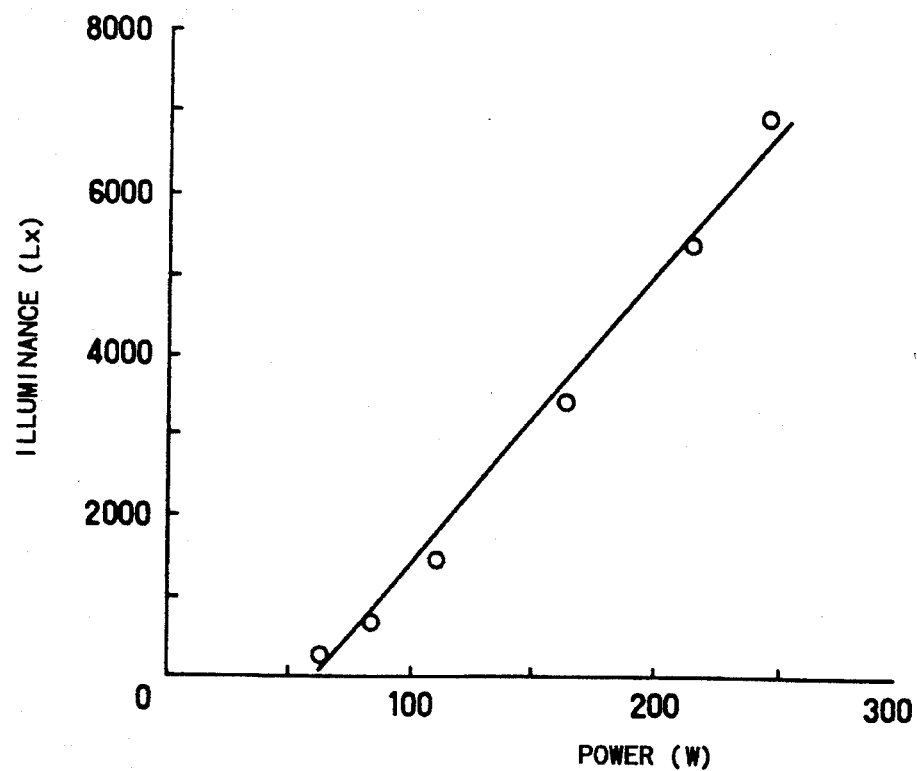
FIG. 7 is a characteristic chart showing a power-illuminance curve of the power regulator.

The high pressure discharge lamp 100 was placed in a box 160 with a window 162. The illuminance of the light going through the window 162 was measured with an illumination photometer 150. FIG. 7 shows the results of the experiment, with illuminance as ordinate and power supplied to the high pressure discharge lamp 100 as abscissa. In the experiment, the illumination photometer 150 was placed at a distance of 0.5 m from the discharge lamp 100.

The results show that the power regulator 1 of the embodiment gives a linear relationship between the power and the illuminance (correlation coefficient: 0.989) and allows stable luminance control in a range of 5 through 100 percents.

Figure 8:
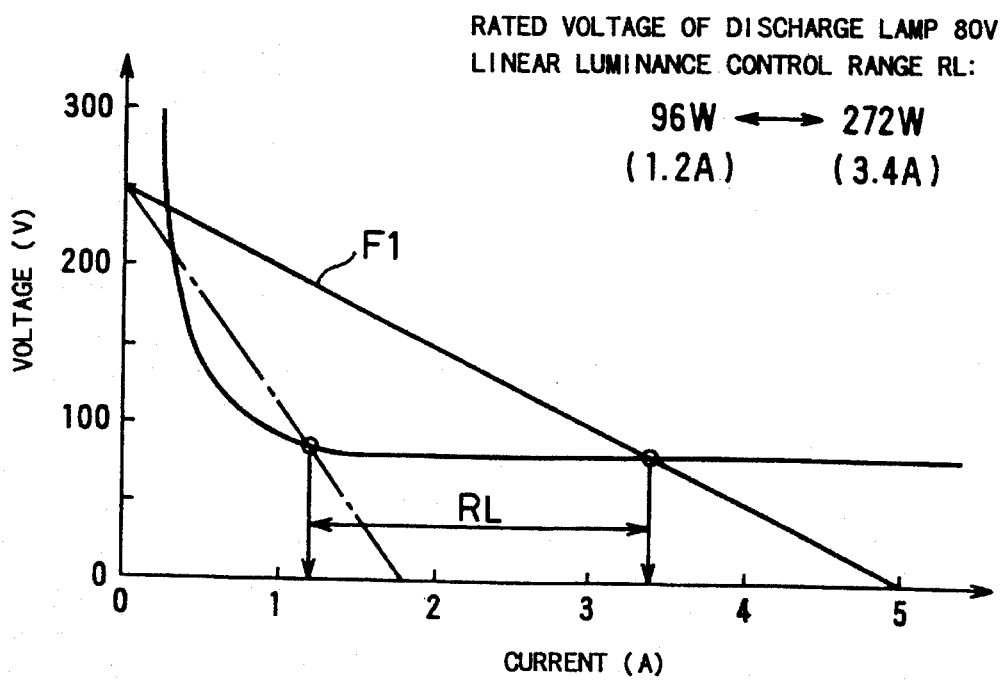
FIG. 8 is a characteristic chart illustrating another example of voltage-current characteristic curves of the discharge lamp and the power regulator.

FIG. 8 is a graph indicating the linear luminance control range RL for the high pressure discharge lamp 100 having the rated lamp voltage of 80 volts. Comparison of the graph of FIG. 8 with that of FIG. 4 clearly shows that the range RL of linear luminance control varies depending upon the rated voltage of the discharge lamp, even if using the same power regulator 1. A preferable range of the rated voltage of the discharge lamp 100 is 70 through 130 volts.

Figure 9:
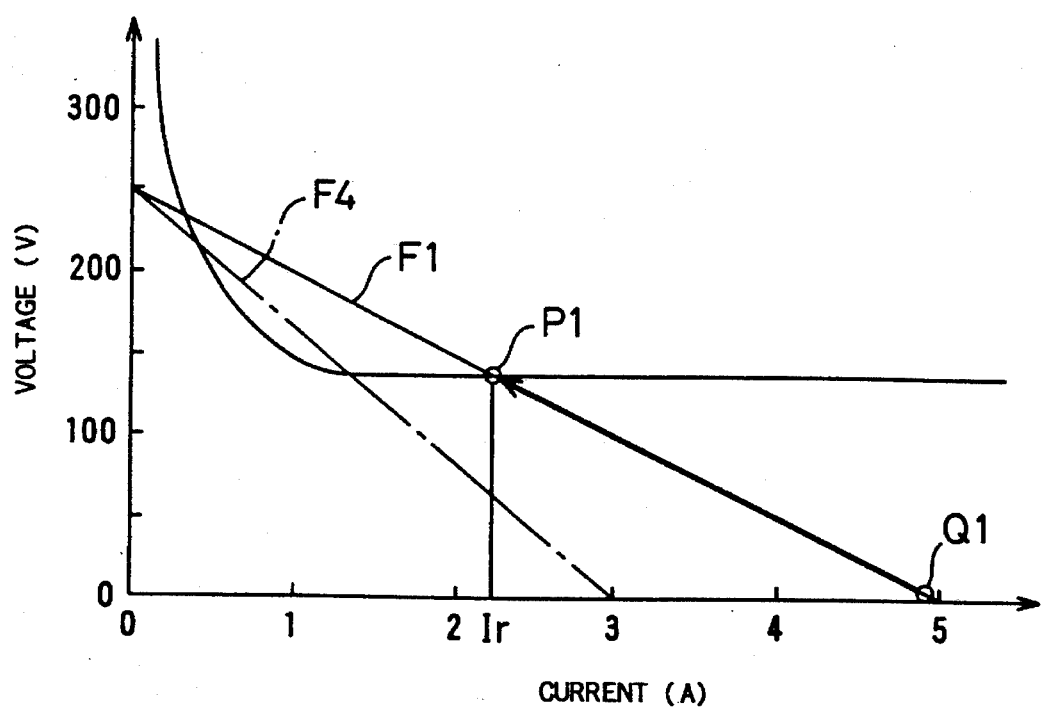
FIG. 9 is a characteristic chart showing a voltage-current behavior at a start-up of a discharge lamp with rated settings.

The lamp has the above voltage-current characteristics in the steady state but shows a different voltage-current behavior until the lamp reaches the steady state after a start-up. FIG. 9 is a graph showing the current-voltage behavior at the lamp start-up. The igniter 90 (see FIG. 1) starts glow discharge, which is then shifted to arc discharge at a point Q1 where a large current flows. The lighting condition shifts back from the point Q1 to the rated point P1 along the characteristic curve F1 to be in the steady state. The shift from the glow discharge to the arc discharge requires a large initial current, and in the example of FIG. 9, the current at the point Q1 (about 5 A) is substantially twice the rated lamp current Ir.

If the preset value of the output luminance regulator 120 corresponds to the rated voltage-current characteristic curve F1, the initial current is big enough, as indicated by the point Q1, that the lamp will be surely turned on. If the preset value of the output luminance regulator 120 is relatively low, as indicated by the voltage-current characteristic curve F4, on the other hand, the initial current is as low as about 3 amperes, and the lamp may fail to be turned on.

Figure 10:
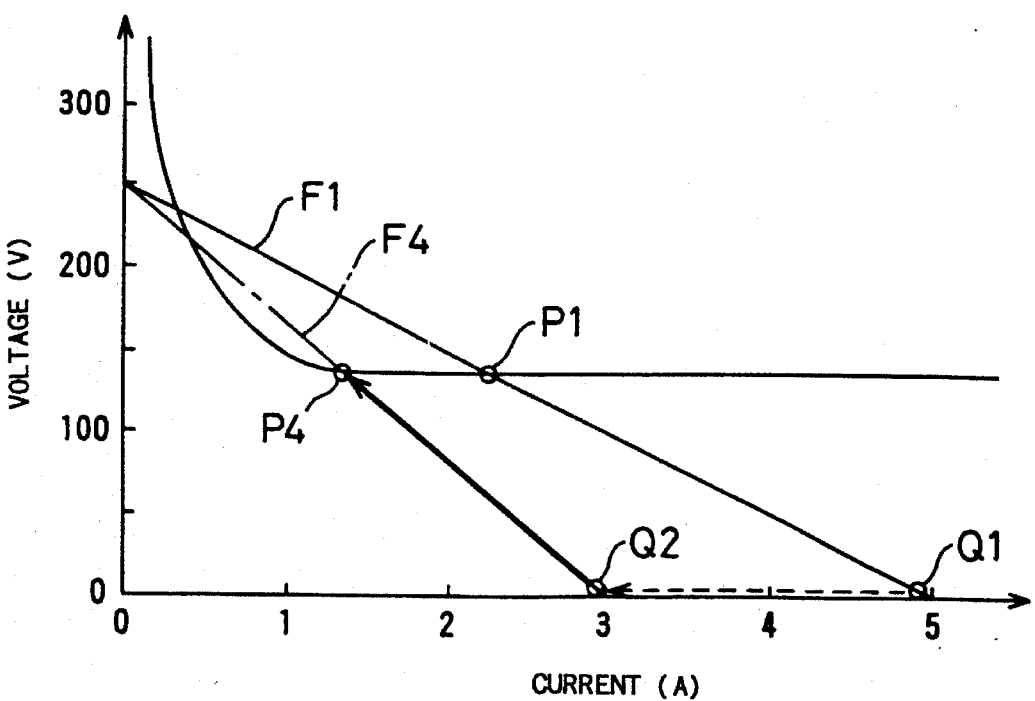
FIG. 10 is a characteristic chart showing a voltage-current behavior at a start-up of a discharge lamp with lower settings.

FIG. 10 is a graph showing a specific operation which assures start-up even with a relatively low preset value of the output luminance regulator 120. As illustrated in FIG. 10, even if the preset value of the output luminance regulator 120 corresponds to the characteristic curve F4, the chopper control circuit 130 controls the start-up according to the rated voltage-current characteristic curve F1. When confirming start of the arc discharge at the point Q1, the chopper control circuit 130 changes its setting from of the rated voltage-current characteristic curve F1 to the characteristic curve F4, whereby the lighting condition will be changed from the point Q1 to another point Q2. The lighting condition then shifts back from the point Q2 to another point P4 along the characteristic curve F4. This results in the steady state lighting at the point P4.

Figure 11:
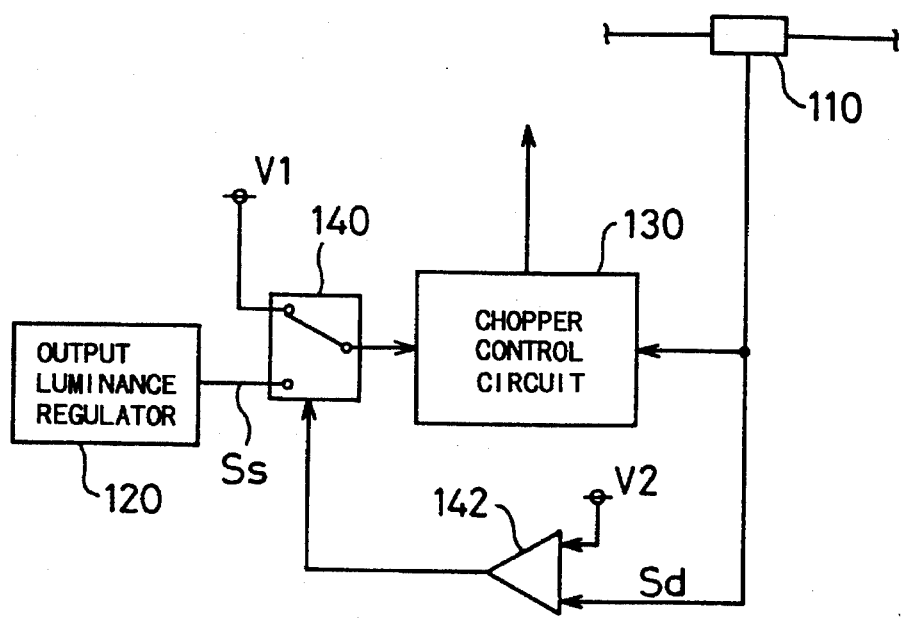
FIG. 11 is a block diagram illustrating a circuit for changing the voltage-current characteristics of the power regulator at the start-up.

FIG. 11 is a block diagram illustrating a circuit for realizing the operation of FIG. 10. The circuit of FIG. 11 is provided with a change-over switch 140 and a comparator 142 along with the current detector 110 with the output luminance regulator 120 and the chopper control circuit 130 of FIG. 1. One input terminal of the change-over switch 140 receives a preset signal Ss of the output luminance regulator 120 while the other input terminal of the change-over switch 140 receives a reference voltage V1 corresponding to the rated voltage-current characteristic curve F1. The comparator 142 compares a predetermined reference voltage V2 with a detection signal Sd transmitted from the current detector 110. When the level of the detection signal Sd is less than the predetermined reference voltage V2, the comparator 142 generates L-level outputs. When the level of the detection signal Sd is equal to or greater than the predetermined reference voltage V2, on the contrary, the comparator 142 generates H-level outputs.

The reference voltage V2 of the comparator 142 is set to be smaller than a signal level of the current detector 110 just after the lighting state shifts from the glow discharge to the arc discharge. The lamp current is several tens milliamperes in the glow discharge state and several amperes in the arc discharge state. The reference voltage V2 is accordingly set, for example, equal to a value corresponding to a detected current of about 0.5 A through about 1 A detected by the current detector 110.

When the level of the detection signal Sd supplied from the current detector 110 is less than the reference voltage V2, the chopper control circuit 130 receives the reference voltage V1 to execute power control according to the rated voltage-current characteristic curve F1. When the level of the detection signal Sd from the current detector 110 is equal to or greater than the reference voltage V2, on the other hand, the comparator 142 generates H-level outputs to change the change-over switch 140. The chopper control circuit 130 then receives the preset value of the output luminance regulator 120 to execute power control according to the voltage-current characteristic curve F4. This results in start-up along the path running through the points Q1, Q2, and P4 shown in FIG. 10.

The power control characteristics may be changed according to the measurement of the lamp voltage instead of the current detected by the current detector 110 as described above. In the former case, the power control characteristics are changed when the lamp voltage reaches a predetermined level (for example, ⅕ of the rated voltage).

Figure 12:
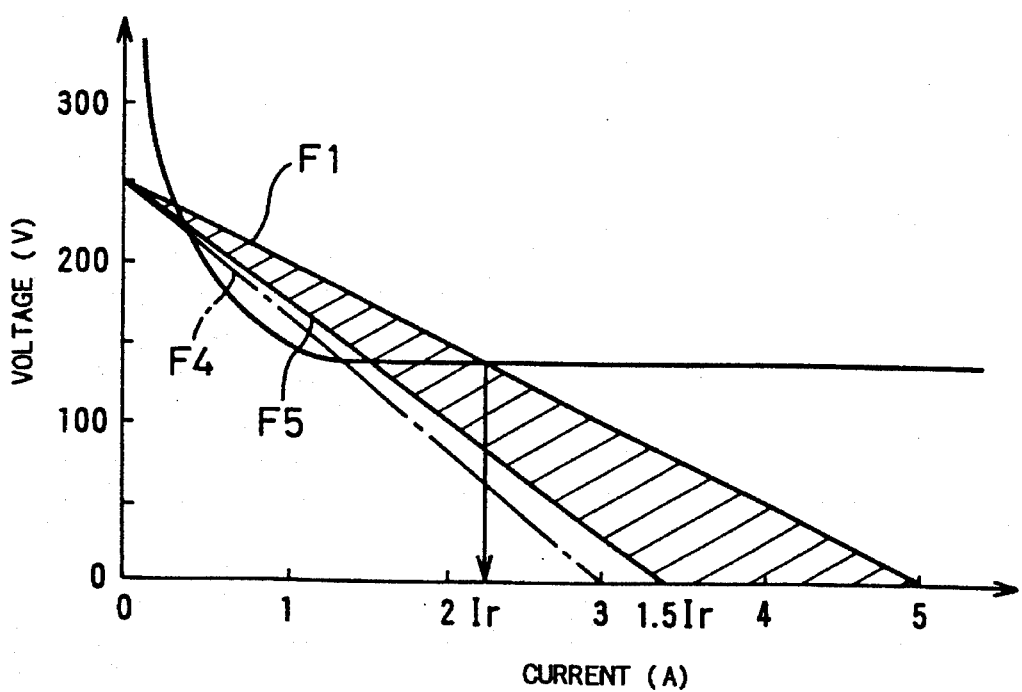
FIG. 12 is a characteristic curve showing a possible setting range of the voltage-current characteristics of the power regulator at the start-up.

Although power regulation is executed according to the rated voltage-current characteristic curve F1 irrespective of the preset value of the output luminance regulator 120, in the above embodiment, the start-up can be controlled according to another voltage-current characteristic, which is lower than the rated voltage-current characteristic curve F1. FIG. 12 shows a possible range of settings at the start-up with the slant lines. The possible setting range (corresponding to the level of the reference voltage V1) is defined by the rated voltage-current characteristic curve F1 and another characteristic curve F5 whose short-circuit current is 1.5 times as large as the rated lamp current Ir. If the voltage-current characteristics at the start-up state is set in the possible setting range, the lamp will be surely turned on even if the preset value of the output luminance regulator 120 is less than this range.

Alternatively, the power control can be executed as follows: when the preset value of the output luminance regulator 120 is within the possible setting range filled with the slant lines in the drawing of FIG. 12, the start-up is controlled according to the voltage-current characteristic curve corresponding to the preset value, and when the preset value of the output luminance regulator 120 is out of the possible setting range, on the contrary, the start-up is controlled according to a predetermined voltage-current characteristic curve within the range (for example, the rated characteristic curve).

Figure 13:
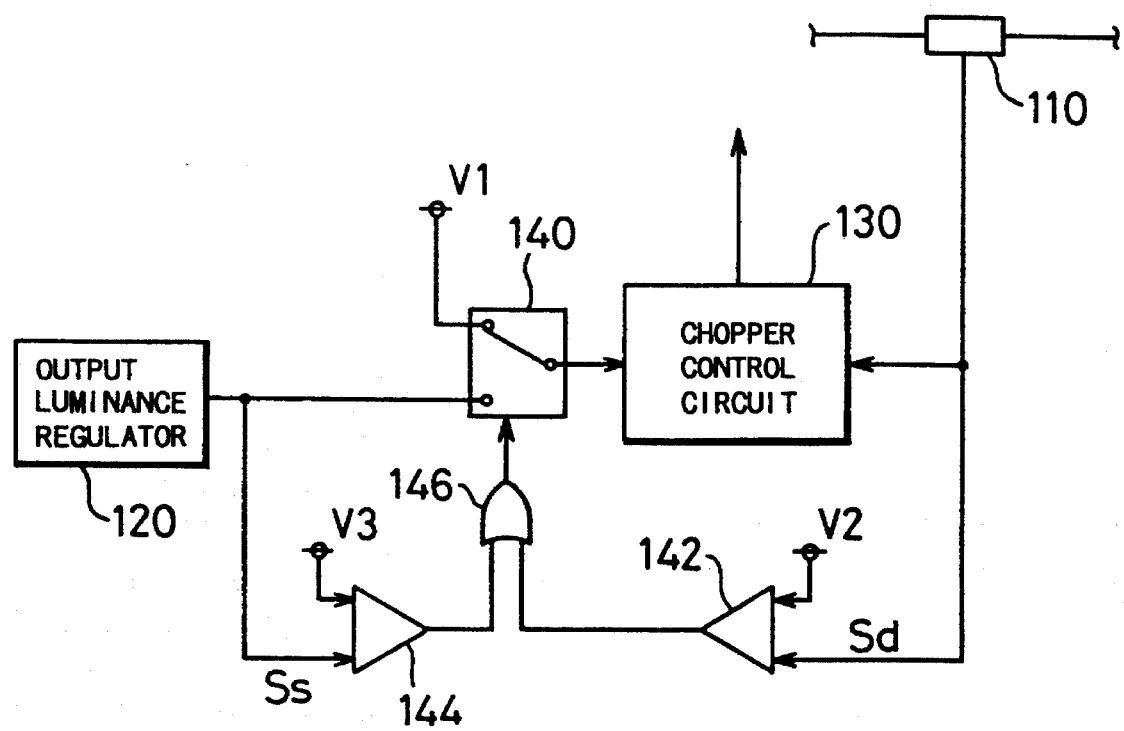
FIG. 13 is a block diagram illustrating another circuit for changing the voltage-current characteristics of the power regulator at the start-up.

FIG. 13 is a block diagram illustrating a circuit for changing over the voltage-current characteristics as described above. The circuit of FIG. 13 includes a second comparator 144 and an OR gate 146 as well as the circuit units of FIG. 11. The comparator 144 compares the level of the preset signal Ss of the output luminance regulator 120 with a reference voltage V3. When the level of the preset signal Ss is less than the reference voltage V3, the comparator 144 generates L-level outputs. When the level of the preset signal Ss is equal to or greater than the reference voltage V3, on the other hand, the comparator 144 generates H-level outputs. The OR gate 146 receives the outputs of the first comparator 142 and the second comparator 144 and gives results of OR operation to the change-over switch 140. The reference voltage V3 of the second comparator 144 corresponds to the voltage-current characteristic curve F5 shown in FIG. 12.

When the level of the detection signal Sd supplied from the current detector 110 is less than the reference voltage V2 of the first comparator 142 and the level of the preset signal Ss of the output luminance regulator 120 is less than the reference voltage V3 of the second comparator 144, the change-over switch 140 is switched to the reference voltage V1. When the level of the detection signal from the current detector 110 is equal to or greater than the reference value V2 of the first comparator 142 or when the level of the preset signal Ss of the output luminance regulator 120 is equal to or greater than the reference voltage V3 of the second comparator 144, the change-over switch 140 is changed to the preset signal Ss of the output luminance regulator 120. The circuit of FIG. 13 assures the start-up irrespective of the settings of the output luminance regulator 120 in the similar manner to the circuit of FIG. 11.

In the power regulator for discharge lamps in the above embodiments, the current regulation means can be any constant-current circuit which operates to output a preset current which is externally inputted and changed. For example, a dc—dc converter such as a flyback converter can be used in place of the chopper circuit described above.

Figure 14:
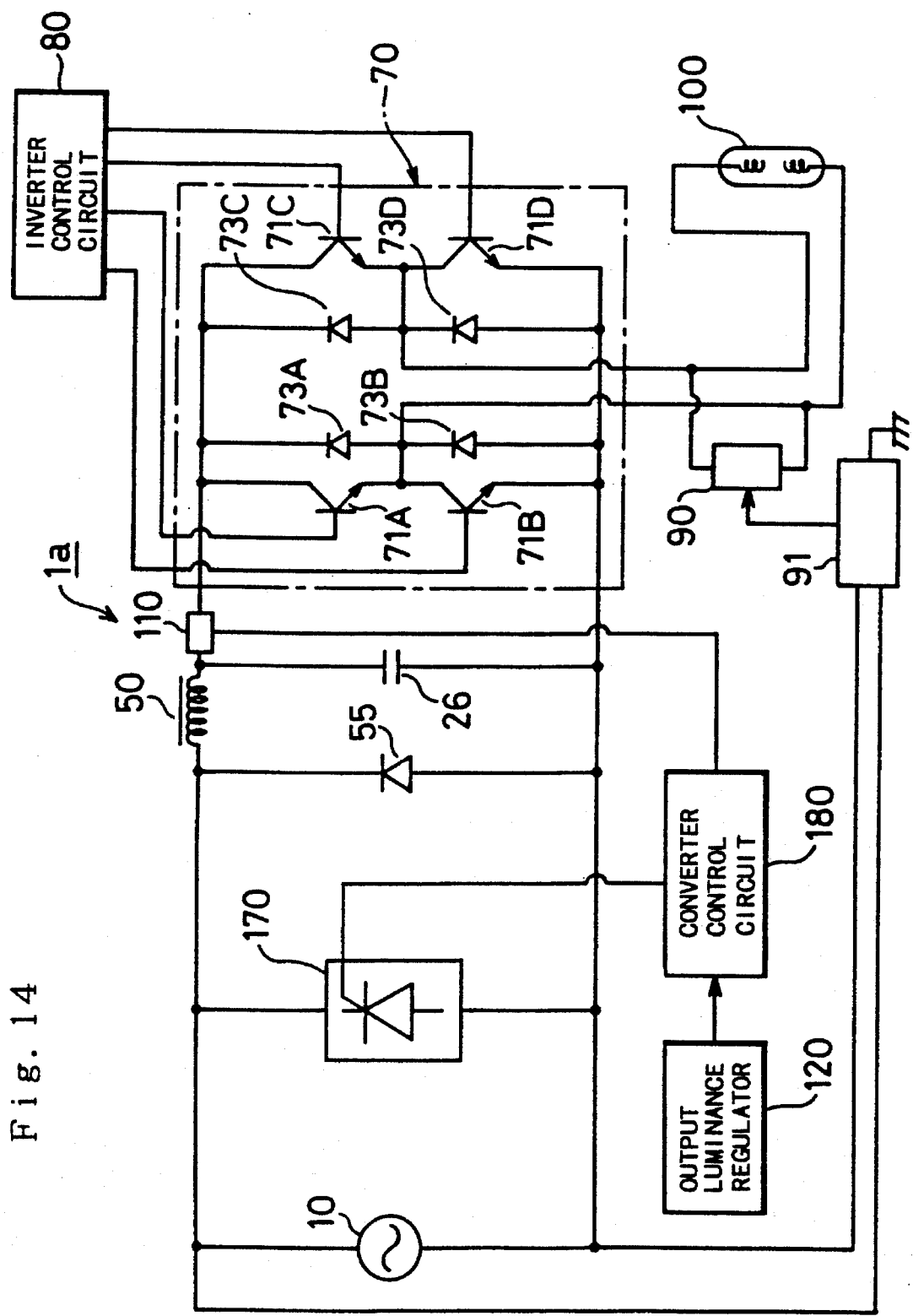
FIG. 14 is a circuit diagram illustrating another power regulator for a discharge lamp, embodying the invention.

Alternatively, a converter with a semi-conductor switch (like a thyristor) can be used while the phase of the semi-conductor switch is controlled according to the current detected by the current detector 110. This structure does not require the chopper circuit 40. FIG. 14 is a block diagram illustrating a modified power regulator 1a, which includes a converter 170 with a thyristor and a converter control circuit 180 for controlling the phase of the thyristor, in place of the rectifier 20, the smoothing capacitor 25, and the chopper control circuit 130 of the power regulator 1 shown in FIG. 1. The modified power regulator 1a has similar effects to those of the regulator shown in FIG. 1.

Although a full-bridge inverter circuit is used as the ac-dc converting means in the above embodiments, other kinds of inverter circuits such as a push-pull circuit can be used instead.

The high luminance discharge lamp, or HID lamp, used herein can be any discharge lamps except fluorescent lamps with filaments disposed therein, and examples of the discharge lamp include metal halide lamps, mercury lamps, xenon lamps, and high pressure sodium lamps.

In the power regulator 1 of the above embodiments, the intersection of the ordinate and the voltage-current characteristic line, or no-load voltage V0, is kept constant while the gradient of the characteristic line is changed according to the preset value of the output luminance regulator 120 as clearly shown in FIG. 3. The chopper control circuit 130 may, however, be constructed to vary the intersection of the ordinate and the voltage-current characteristic line according to the preset value of the output luminance regulator 120 while the gradient of the characteristic line is kept constant.

A variable color illumination apparatus 200 including the power regulator with a dimmer control circuit is described below with the drawing of FIG. 15.

Figure 15:
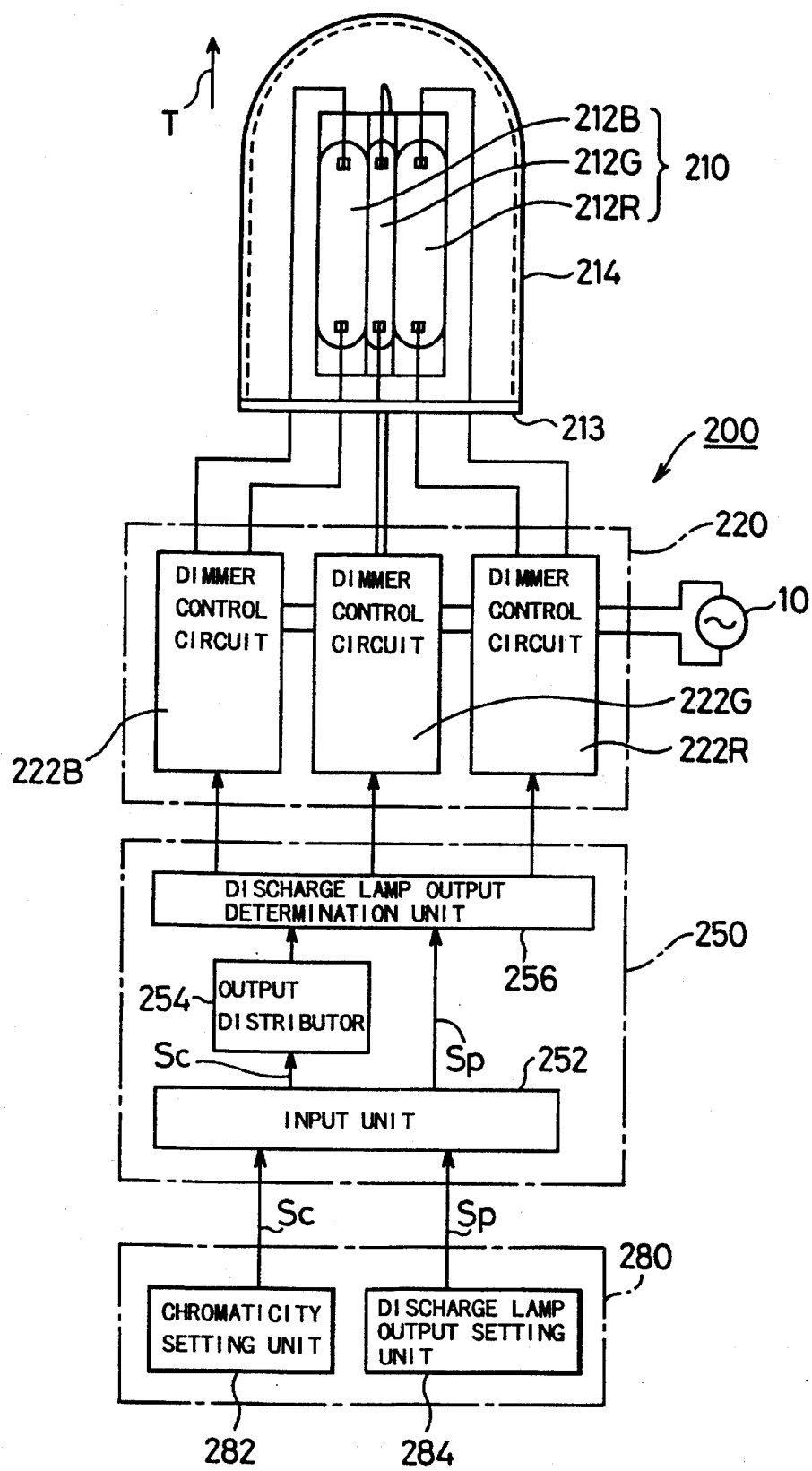
FIG. 15 is a block diagram showing a variable color illumination apparatus embodying the invention.

With reference to FIG. 15, the variable color illumination apparatus 200 includes a variable color lamp 210, a power control circuit 220, a tone control circuit 250, and a remote controller 280.

Figure 16:
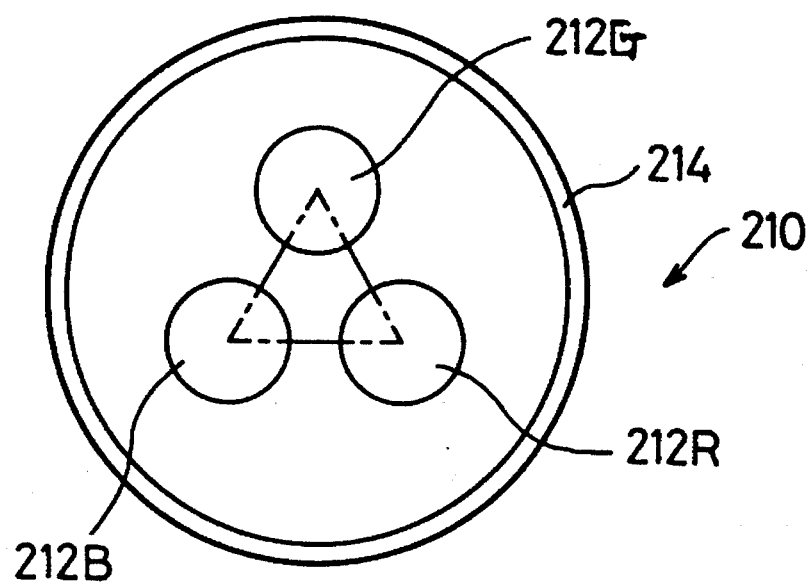
FIG. 16 shows an arrangement of discharge lamps disposed in a variable color lamp.
Figure 17A:
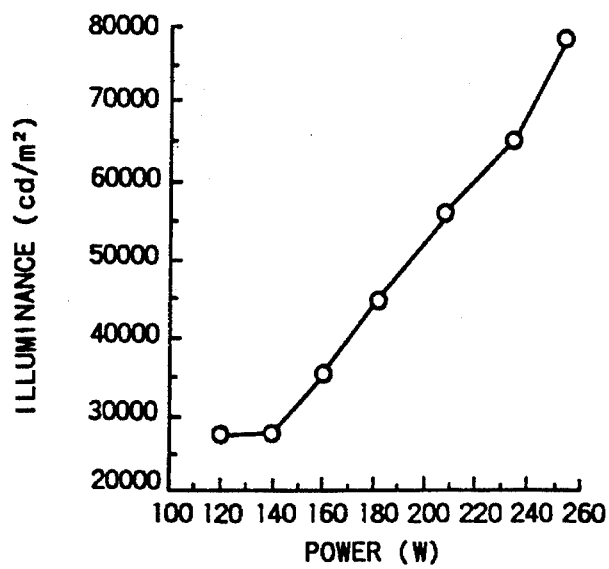
FIGS. 17(A) through 17(C) are graphs showing the illuminance, the voltage, the current, and the chromaticity of the discharge lamp 212B plotted against the power.
Figure 17B:
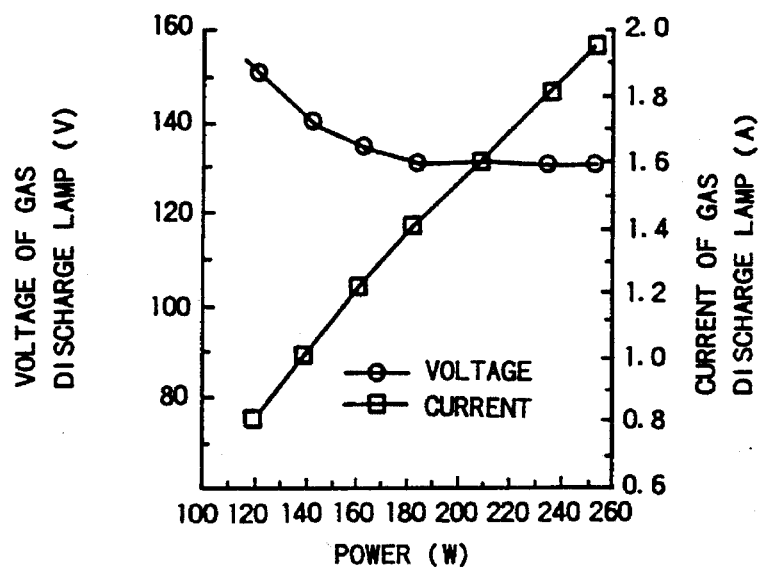
Figure 17C:
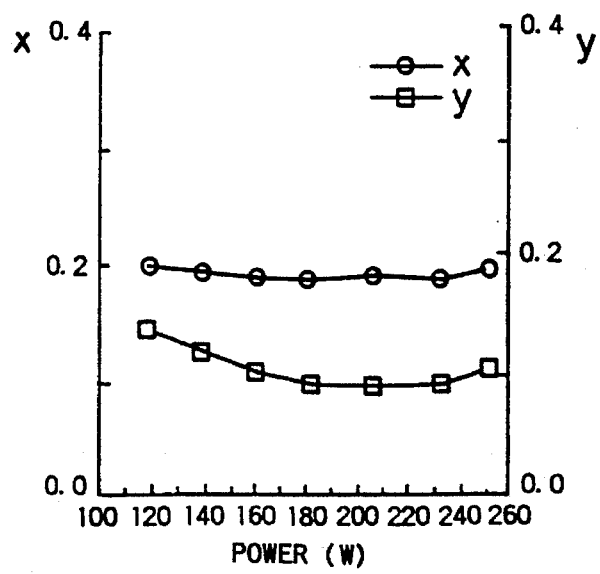
Figure 18A:
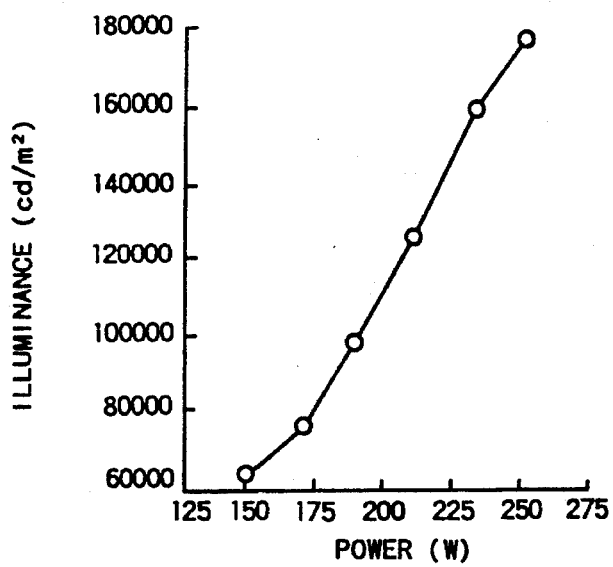
FIGS. 18(A) through 18(C) are graphs showing the illuminance, the voltage, the current, and the chromaticity of the discharge lamp 212G plotted against the power.
Figure 18B:
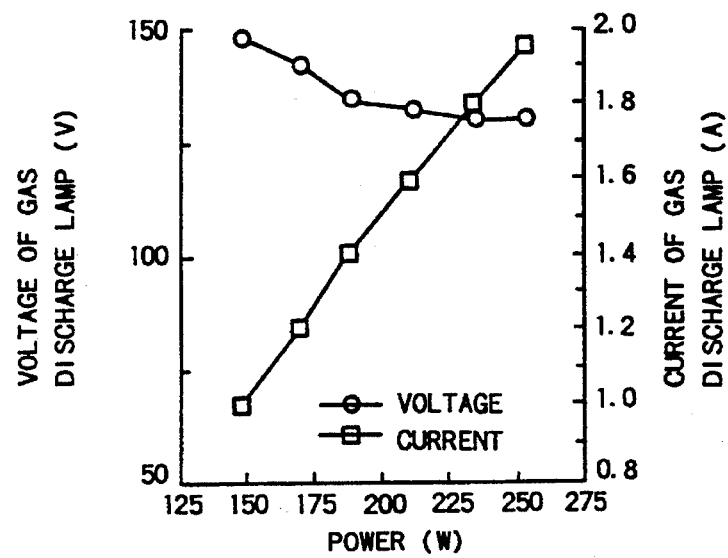
Figure 18C:
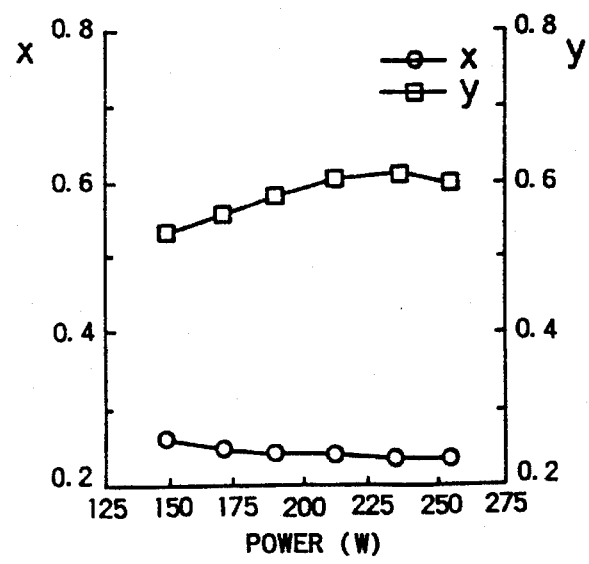
Figure 19A:
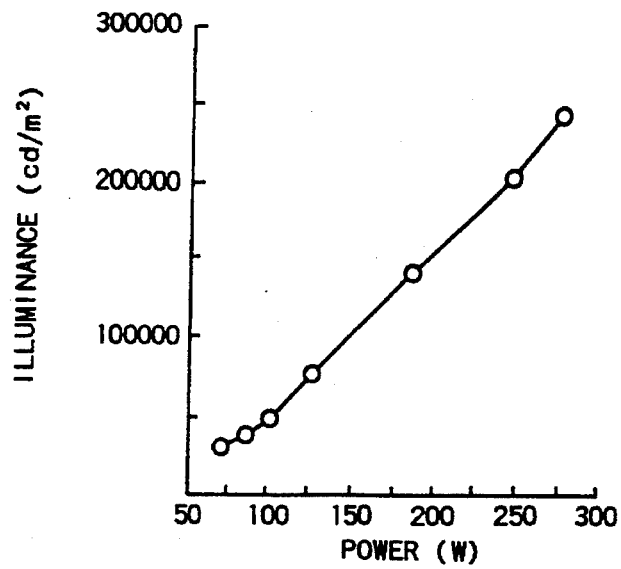
FIGS. 19(A) through 19(C) are graphs showing the illuminance, the voltage, the current, and the chromaticity of the discharge lamp 212R plotted against the power.
Figure 19B:
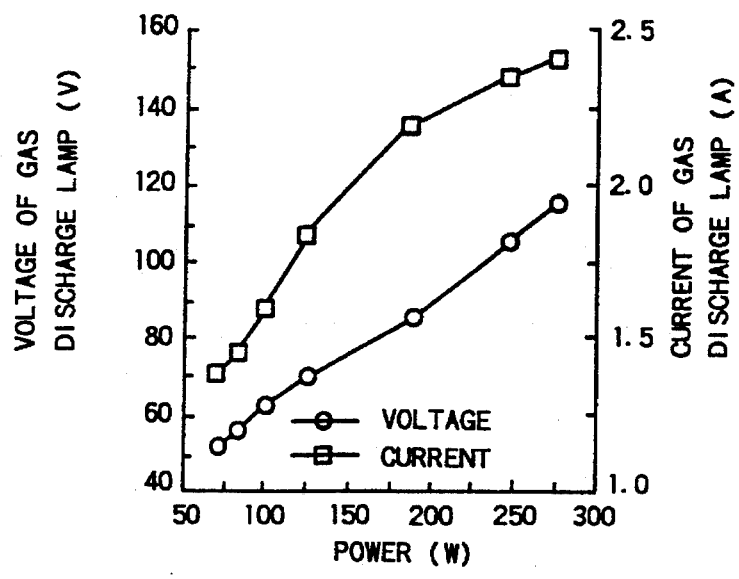
Figure 19C:
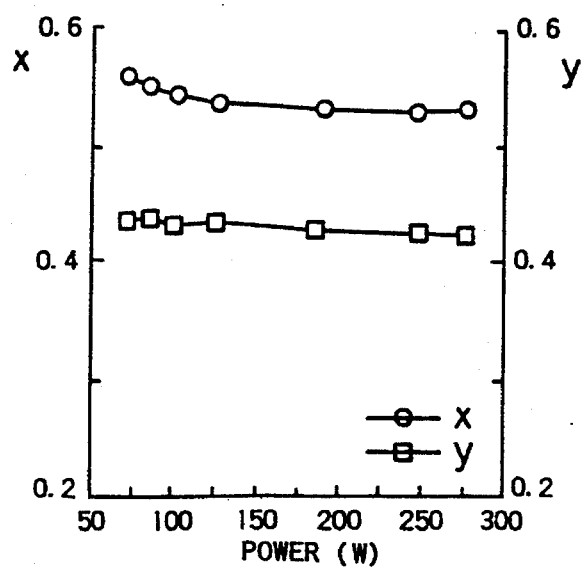

As illustrated in the plan view of FIG. 16, the variable color lamp 210 includes an outer tube 214 fixed to an alumina base 213, and three discharge lamps 212R, 212G, and 212B disposed in the outer tube 214. The three discharge lamps 212R, 212G, and 212B are arranged to form a virtual equilateral triangle as shown with the one-dot chain line in FIG. 16. Different two- or multi-component amalgams are sealed respectively in the discharge lamps 212R, 212G, and 212B to emit colors similar to the three primary colors.

The discharge lamp 212B includes a Hg—In binary amalgam sealed therein, and emits purple blue light having line spectra of 411 nm and 451 nm. The discharge lamp 212G includes a Hg—Tl binary amalgam sealed therein, and emits green light having a line spectrum of 535 nm. The discharge lamp 212R includes a Hg—Na binary amalgam sealed therein, and emits yellow red light having a line spectrum of 589 nm.

Japanese Industrial Standard (JIS Z8110) defines color names of monochromatic light corresponding to wavelength ranges as follows:

380–455 nm: purple blue
455–485 nm: blue
485–495 nm: blue green
495–548 nm: green
548–573 nm: green yellow
573–584 nm: yellow
584114 610 nm: yellow red
610–780 nm: red In the specification of the present invention, 'light in the blue wavelength range' denotes the light having wave lengths ranging from 380 through 495 nm, 'light in the green wavelength range' ranging from 485 through 573 nm, and 'light in the red wavelength range' ranging from 573 through 780 nm, respectively.

Dimmer control characteristics of 250 W discharge lamps 212R, 212G, and 212B are shown in FIGS. 17(A) through 19(C). The illuminance is plotted as ordinate and the power as abscissa in FIGS. 17(A), 18(A), and 19(A). The voltage and current of the discharge lamp are plotted as ordinate and the power as abscissa in FIGS. 17(B), 18(B), and 19(B). The chromaticity x,y is plotted as ordinate and the power as abscissa in FIGS. 17(C), 18(C), and 19(C).

As clearly shown in FIGS. 17 through 19, each of the discharge lamps 212R, 212G, and 212G shows linear illuminance change along with an increase in the power supply while the chromaticity x, y are kept substantially unchanged.

The power control circuit 220 includes three dimmer control circuits 222R, 222G, and 222B for supplying power to the discharge lamps 212R, 212G, and 212B. Each of the dimmer control circuits 222R, 222G, and 222B has a circuit structure identical with that of the power regulator 1 described above.

The tone control circuit 250 includes an input unit 252, an output distributor 254, and a discharge lamp output determination unit 256.

The remote controller 280 has a chromaticity setting unit 282 and a discharge lamp output setting unit 284. The remote controller 280 is provided with keys for inputting various instructions and a display unit for displaying the operating conditions of the variable color lamp 210.

The operator sets the chromaticity and outputs of the discharge lamps through operation of the keys on the remote controller 280, so that the luminous color and the luminous flux of the variable color lamp 210 can be varied. The chromaticity is input, for example, as coordinates in an x-y chromaticity coordinates system as described later. The output of each discharge lamp is set, for example, as a relative output (percent) with respect to the maximum output of the discharge lamp at each chromaticity. The chromaticity setting unit 282 and the discharge lamp output setting unit 284 of the remote controller 280 generate a chromaticity signal Sc and a discharge lamp output signal Sp according to the key-input values and transmit the signals Sc and Sp to the input unit 252 of the tone control circuit 250, respectively.

The chromaticity signal Sc is transmitted from the input unit 252 to the output distributor 254, which determines relative fluxes of the three discharge lamps 212R, 212G, and 212B according to the rule of additive mixture of color stimuli so as to realize the chromaticity defined by the chromaticity signal Sc.

The discharge lamp output determination unit 256 calculates the output level of each discharge lamp based on the discharge lamp output signal Sp and the relative flux (that is, the relative output rate) of the discharge lamp determined by the output distributor 254. The output level of the discharge lamp having the largest relative output rate, which is determined by the output distributor 254, is set equal to a level obtained by multiplying the rated output of the discharge lamp by the relative output (percent) indicated by the discharge lamp output signal Sp. When the relative output rate of the three discharge lamps is 0.6:0.4:1.0 and the relative output defined by the discharge lamp output signal Sp is equal to 70 percents, for example, the output levels of the discharge lamps are respectively set equal to 42, 28, and 70 percents.

Signals representing the respective output levels of the discharge lamps are transmitted from the discharge lamp output determination unit 256 to the three dimmer control circuits 222R, 222G, and 222B, which execute the dimmer control through the current regulation as described above based on the signals supplied from the tone control circuit 250.

The variable color illumination apparatus 200 thus constructed was used in the experiment where the power supply to the three discharge lamps 212R, 212G, and 212B of the variable color lamp 210 was varied to change the chromaticity. The results of the experiment are shown in FIG. 20.

Figure 20:
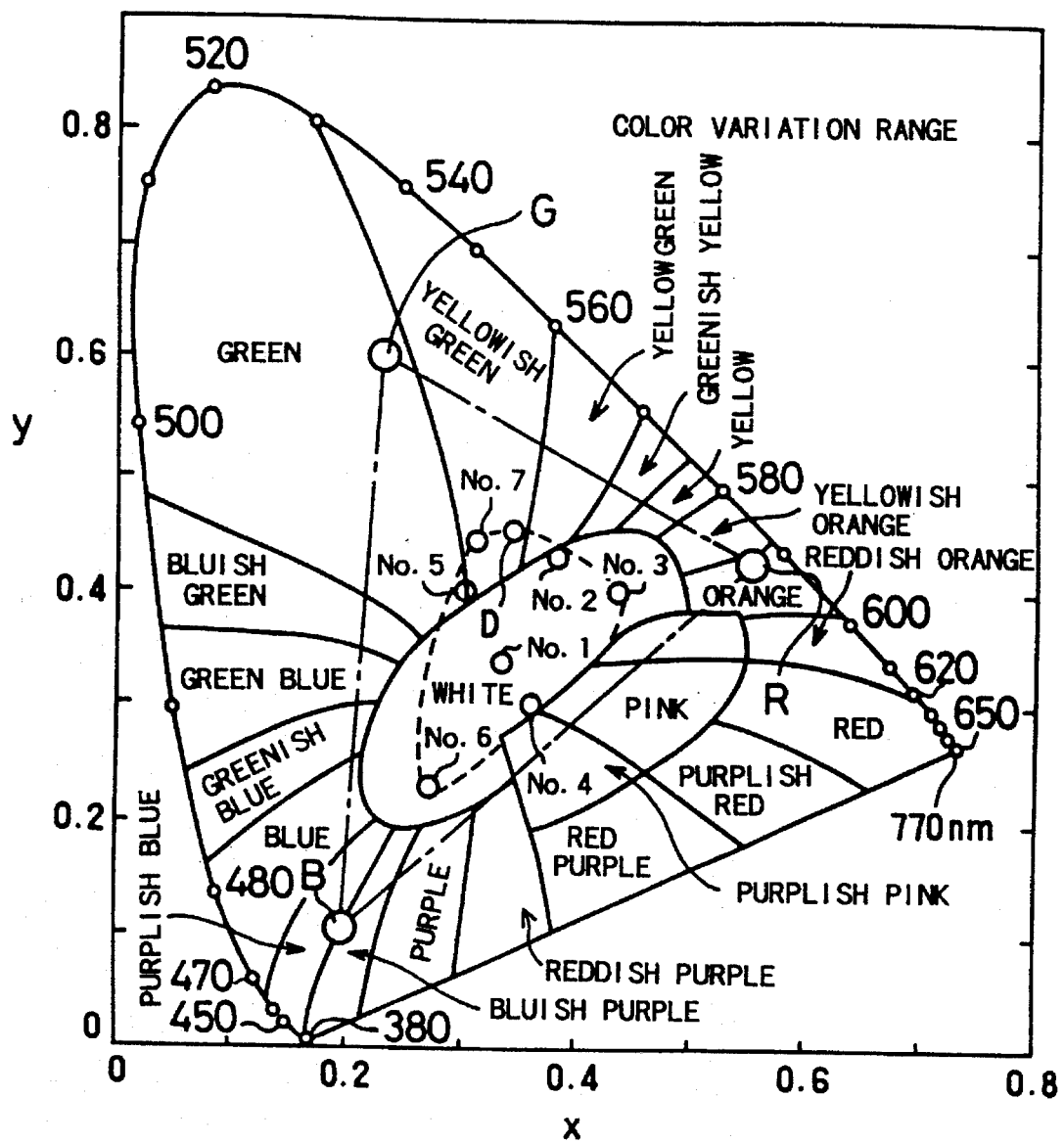
FIG. 20 is a graph showing the chromaticity of the variable color lamp in the embodiment.

FIG. 20 is an x-y chromaticity chart showing the relationship between the relative outputs and the luminous colors of the discharge lamps 212R, 212G, and 212B. In the chart of FIG. 20, points R, G, and B respectively denote luminous color points of the discharge lamps 212R, 212G, and 212B. The luminous color of the variable color lamp 210 can be varied within a triangular range defined by the three points A, B, and C according to the color addition rule (additive mixture of color stimuli).

Power was supplied to the discharge lamps 212R, 212G, and 212B in the conditions labeled No. 1 through No. 7 in FIG. 21 where the power was ranging from 150 W through 250 W, and the variable color lamp 210 emitted light at chromaticity as indicated by the labels of No. 1 through No. 7 in FIG. 20.

The discharge lamps 212R, 212G, and 212B emit rays towards the top end of each discharge lamp from the base 213, that is, in a lighting direction T, as shown in FIG. 15. Each of the discharge lamps 212R, 212G, and 212B does not accordingly interfere with rays emitted from the other discharge lamps, and this allows the variable color lamp 210 to have a large luminous flux in the lighting direction T. The luminous color in the lighting direction T can be varied as indicated by the color matching functions of the chromaticity coordinates system by regulating the relative outputs of the discharge lamps 212R, 212G, and 212B.

As described above, the luminous colors of the three discharge lamps 212R, 212G, and 212B, which emit colors similar to the three primary colors R, G, and B, are adjusted by varying the relative outputs of the discharge lamps.

Continuous adjustment of the relative outputs of the three discharge lamps emitting luminous colors of different chromaticity allows continuous variation in the chromaticity and the color temperature without lowering the luminance of the variable color lamp 210 significantly.

In the above embodiment, the inverter circuit 70 (FIG. 1) included in the power control circuit 220 supplies square-wave current to the discharge lamps 212R, 212G, and 212B. Since square waves do not have time-dependent change in the power for respective periods, which is not the case with sine waves, the luminance of the discharge lamp is kept substantially uniform. The variable color illumination apparatus 200 accordingly realizes stable color emission from the variable color lamp 210 in a wide range of chromaticity.

Figure 22:
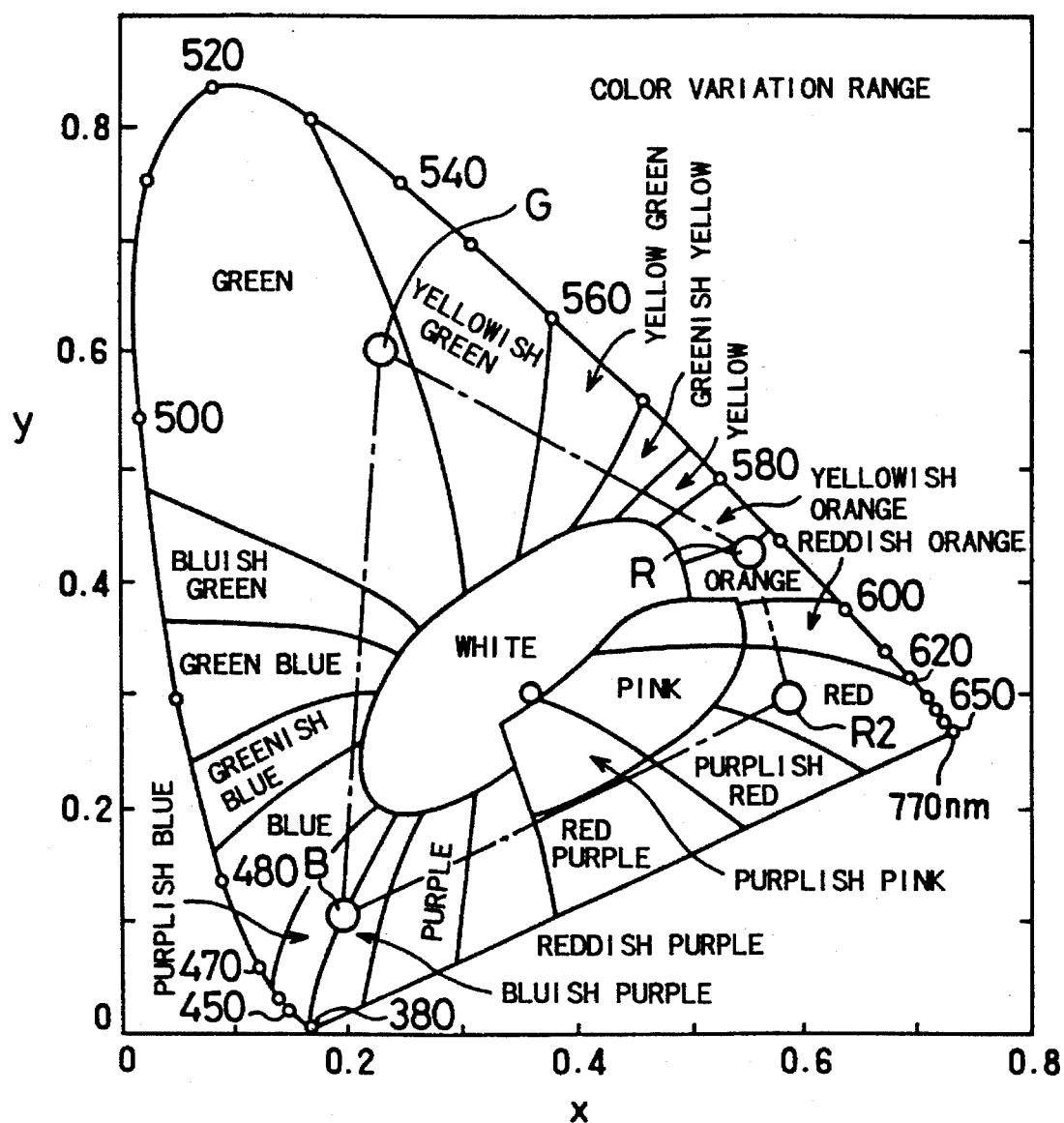
FIG. 22 is a graph showing another example of the chromaticity of the variable color lamp.

The above embodiment is only illustrative and not restrictive in any sense, and there may be many modifications, changes, and alterations without departing from the spirit or scope of the primary characteristics of the invention as follows:

(1) Although the above embodiment includes the three discharge lamps 212R, 212G, and 212B for emitting rays of three different colors, the lighting system may have any number of discharge lamps emitting luminous colors of different chromaticity. For example, another discharge lamp having a Hg—Li binary amalgam sealed therein and emitting a line spectrum R2 at 650 nm (red light) may be added to the three discharge lamps 212R, 212G, and 212B used in the embodiment. In this case, the chromaticity is varied in a rectangular range in the color coordinates system shown by the one-dot chain line in FIG. 22.

The number of discharge lamps can be arbitrarily determined as described above. The color coordinates are determined according to the combination of discharge lamps, and the range of color variation is defined based on the color coordinates.

(2) The chromaticity of plural discharge lamps can be of the intrinsic colors dependent on the vapor materials sealed in the discharge lamps, and alternatively the intrinsic colors of the plural lamps can be identical with each other while the chromaticity of each discharge lamp is varied by coloring the discharge lamp or by applying a color filter onto the discharge lamp.

As described above, the power regulator of the present invention controls the power supply to the discharge lamp to allow variation in the current at a constant frequency without causing superposition of the quiescent time which may result in unintentional turn-out of the discharge lamp. The discharge lamp does not turn out due to the dimmer control operations but stably energized in a wide dimmer-operation range. The variable color illumination apparatus using the power regulator gives stable emission of various colors at sufficient luminance.

INDUSTRIAL APPLICATION

The power regulator and the variable color illumination apparatus in accordance with the present invention are favorably applicable to a variety of interior and exterior lighting apparatus using discharge lamps.

What is claimed is:

1. A power regulator for controlling a power supplied to a discharge lamp, comprising:

a converter for converting a first alternating-current power to a direct-current power;

an inverter for converting said direct-current power to a second alternating-current power and supplying said second alternating-current power to said discharge lamp;

an inverter control circuit for controlling said inverter;

power setting means for arbitrarily setting a desired value corresponding to a current of said discharge lamp and outputting a setting signal indicative of said desired value; and dimmer control means for controlling the power supplied to said discharge lamp based on said desired value set by said power setting means, comprising:

current regulation means having a current control terminal, interposed between said converter and said inverter, for regulating an output current according to a current control signal supplied to said current control terminal, current detection means for detecting the output current of said current regulation means to thereby generate a detection signal, and current control means for outputting the current control signal to said current control terminal of said current regulation means so that the detection signal output from said current detection means coincides with the setting signal supplied from said power setting means, wherein said inverter control circuit converts said direct-current power to said second alternating-current power of a constant frequency; and an output voltage and an output current of said power regulator have a linear relationship, and a gradient of said linear relationship is varied according to said desired value specified by said power setting means.

2. A power regulator for controlling a power supplied to a discharge lamp, comprising:

a converter for converting a first alternating-current power to a direct-current power;

an inverter for converting said direct-current power to a second alternating-current power and supplying said second alternating-current power to said discharge lamp;

an inverter control circuit for controlling said inverter;

power setting means for arbitrarily setting a desired value corresponding to a current of said discharge lamp and outputting a setting signal indicative of said desired value; and dimmer control means for controlling the power supplied to said discharge lamp based on said desired value set by said power setting means, comprising:
  current detection means for detecting an output current of said converter, and
  converter control means for executing phase regulation of a semi-conductor switch element included in said converter so that the detection signal output from said current detection means coincides with the setting signal supplied from said power setting means, wherein said inverter control circuit converts said direct-current power to said second alternating-current power of a constant frequency; and an output voltage and an output current of said power regulator have a linear relationship, and a gradient of said linear relationship is varied according to said desired value specified by said power setting means.

3. A power regulator in accordance with claim 1, wherein a no-load voltage in the linear relationship between the output voltage and the output current of said power regulator is constant irrespective of said desired value specified by said power setting means, and a short-circuit current on said linear relationship is varied linearly according to said desired value specified by said power setting means.

4. A power regulator in accordance with claim 1, wherein said power regulator regulates an output of a discharge lamp in a range of about 100 percents through about 130 percents of a rated voltage of said discharge lamp.

5. A power regulator in accordance with claim 1, wherein the current of said discharge lamp has a square wave form.

6. A variable color illumination apparatus having a variable color lamp including a plurality of discharge lamps which emit lights of different chromaticity, for regulating a power supplied to each of said plurality of discharge lamps to vary a chromaticity of light emitted from said variable color lamp, said variable color illumination apparatus comprising:

power setting means for outputting a setting signal to specify a desired value corresponding to a current of each of said plurality of discharge lamps; and a plurality of dimmer control means in accordance with claim 1, for regulating the power supplied to each of said plurality of discharge lamps based on the desired value specified by said power setting means.

7. A power regulator in accordance with claim 2, wherein a no load voltage in the linear relationship between the output voltage and the output current of said power regulator is constant irrespective of said desired value specified by said power setting means, and a short circuit current on said linear relationship is varied linearly according to said desired value specified by said power setting means.

8. A power regulator in accordance with claim 2, wherein said power regulator regulates an output of a discharge lamp in a range of about 100% through about 130% of a rated voltage of said discharge lamp.

9. A power regulator in accordance with claim 3, wherein said power regulator regulates an output of a discharge lamp in the range of about 100% through about 130% of a rated voltage of said discharge lamp.

10. A power regulator in accordance with claim 2, wherein the current of said discharge lamp has a square waveform.

11. A power regulator in accordance with claim 3, wherein the current of said discharge lamp has a square waveform.

12. A power regulator in accordance with claim 4, wherein the current of said discharge lamp has a square waveform.

13. A variable color illumination apparatus having a variable color lamp including a plurality of discharge lamps which emit light of different chromaticity, for regulating a power supply to each of said plurality of discharge lamps to vary a chromaticity of light emitted from said variable color lamp, said variable color illumination apparatus comprising:

power setting means for arbitrarily setting a desired value corresponding to a current of each of said discharge lamps and outputting a setting signal indicative of said desired value; and a plurality of dimmer control means for regulating the power supplied to each of said plurality of discharge lamps based on the desired value specified by said power setting means.

14. A variable color illumination apparatus having a variable color lamp including a plurality of discharge lamps which emit light of different chromaticity, for regulating a power supply to each of said plurality of discharge lamps to vary a chromaticity of light emitted from said variable color lamp, said variable color illumination apparatus comprising:

power setting means for arbitrarily setting a desired value corresponding to a current of each of said discharge lamps and outputting a setting signal indicative of said desired value; and a plurality of dimmer control means for controlling the power supplied to said discharge lamps based on said desired values set by said power setting means, comprising current detection means for detecting an output current of a converter supplying power to said discharge lamps, and converter control means for executing phase regulation of a semi-conductor switch element included in said converter so that the detection signal output from said current detection means coincides with the setting signal supplied from said power setting means, the plurality of dimmer control means regulating the power supplied to each of said plurality of discharge lamps based on the desired value specified by said power setting means.

15. The variable color illumination apparatus according to claim 14 further comprising a power regulator for controlling power supplied to the discharge lamps, the power regulator including said converter, said converter converting a first alternating current power to a direct current power, the regulator further comprising an inverter for converting said direct current power to a second alternating current power and supplying said second alternating-current power to said discharge lamps, and an inverter control circuit for controlling said inverter, the inverter control circuit converting said direct current power to said second alternating current power of a predetermined frequency, an output voltage and an output current of said power regulator having a linear relationship, and a gradient of said linear relationship being varied according to said desired value specified by said power setting means, and further wherein a no load voltage in the linear relationship between the output voltage and the output current of said power regulator is constant irrespective of said desired value specified by said power setting means, and a short circuit current on said linear relationship is varied linearly according to said desired value as specified by said power setting means.

16. The variable color illumination apparatus according to claim 15, wherein the power regulator regulates an output of a discharge lamp in a range of about 100% through about 130% of a rated voltage of said discharge lamp.

17. The variable color illumination apparatus according to claim 15, wherein the current of said discharge lamp has a square waveform.

* * * * *